US012786930B2

(12) United States Patent
Raghavan et al.

(10) Patent No.: US 12,786,930 B2
(45) Date of Patent: Nov. 3, 2026

(54) SIGNALING BETWEEN A PERCEPTION-ASSISTANCE NODE, A USER EQUIPMENT (UE), AND A BASE STATION

(71) Applicant: QUALCOMM Incorporated, San Diego, CA (US)

(72) Inventors: Vasanthan Raghavan, West Windsor Township, NJ (US); Junyi Li, Fairless Hills, PA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 841 days.

(21) Appl. No.: 18/062,330

(22) Filed: Dec. 6, 2022

(65) Prior Publication Data

US 2024/0188025 A1 Jun. 6, 2024

(51) Int. Cl.
*H04W 64/00* (2009.01)

(52) U.S. Cl.
CPC .................................. *H04W 64/00* (2013.01)

(58) Field of Classification Search
CPC .............................. H04W 4/026; H04W 64/00
USPC ............ 455/456.1, 456.2, 456.3, 411, 404.2, 455/452.1, 404.1
See application file for complete search history.

(56) References Cited

U.S. PATENT DOCUMENTS 12,141,675 B1 * 11/2024 Duong .................. H04B 7/024
12,143,941 B1 * 11/2024 Duong .................. G06N 20/00
12,185,134 B1 * 12/2024 Duong .................. H04W 24/02
2022/0104111 A1 3/2022 Zorgui et al.
2022/0225121 A1 7/2022 Wanuga et al.
2023/0046840 A1 * 2/2023 Ramanathan ........... G06T 7/593
2023/0188832 A1 * 6/2023 Xu ....................... H04N 23/632 348/333.01
2023/0258815 A1 * 8/2023 Ghimire ................. G01S 19/08 455/456.1
2023/0337123 A1 * 10/2023 Tsuda ..................... H04L 67/51
2024/0129822 A1 * 4/2024 Huang .................. H04W 36/08

FOREIGN PATENT DOCUMENTS

WO 2022006410 A1 1/2022
WO 2022082144 A2 4/2022
WO WO-2022084401 A2 * 4/2022 .......... G01S 19/215

OTHER PUBLICATIONS

International Search Report and Written Opinion—PCT/US2023/075378—ISA/EPO—Oct. 8, 2024.

* cited by examiner

*Primary Examiner* — Joseph Arevalo
(74) *Attorney, Agent, or Firm* — Thien T. Nguyen

(57) ABSTRACT

Disclosed are techniques for wireless communication. In an aspect, a network node receives first perception information from at least one user equipment (UE), and transmits first perception-assistance information to the at least one UE, the first perception-assistance information determined based at least in part on the first perception information.

37 Claims, 15 Drawing Sheets

SIGNALING BETWEEN A PERCEPTION-ASSISTANCE NODE, A USER EQUIPMENT (UE), AND A BASE STATION

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a network node includes receiving first perception information from at least one user equipment (UE); and transmitting first perception-assistance information to the at least one UE, the first perception-assistance information determined based at least in part on the first perception information.

In an aspect, a method of wireless communication performed by a user equipment (UE) includes transmitting first perception information to a perception-assistance node in communication with a base station serving the UE; and receiving first perception-assistance information from the perception-assistance node, the first perception-assistance information determined based at least in part on the first perception information.

In an aspect, a network node includes a memory; at least one transceiver; and at least one processor communicatively coupled to the memory and the at least one transceiver, the at least one processor configured to: receive, via the at least one transceiver, first perception information from at least one user equipment (UE); and transmit, via the at least one transceiver, first perception-assistance information to the at least one UE, the first perception-assistance information determined based at least in part on the first perception information.

In an aspect, a user equipment (UE) includes a memory; at least one transceiver; and at least one processor communicatively coupled to the memory and the at least one transceiver, the at least one processor configured to: transmit, via the at least one transceiver, first perception information to a perception-assistance node in communication with a base station serving the UE; and receive, via the at least one transceiver, first perception-assistance information from the perception-assistance node, the first perception-assistance information determined based at least in part on the first perception information.

In an aspect, a network node includes means for receiving first perception information from at least one user equipment (UE); and means for transmitting first perception-assistance information to the at least one UE, the first perception-assistance information determined based at least in part on the first perception information.

In an aspect, a user equipment (UE) includes means for transmitting first perception information to a perception-assistance node in communication with a base station serving the UE; and means for receiving first perception-assistance information from the perception-assistance node, the first perception-assistance information determined based at least in part on the first perception information.

In an aspect, a non-transitory computer-readable medium stores computer-executable instructions that, when executed by a network node, cause the network node to: receive first perception information from at least one user equipment (UE); and transmit first perception-assistance information to the at least one UE, the first perception-assistance information determined based at least in part on the first perception information.

In an aspect, a non-transitory computer-readable medium stores computer-executable instructions that, when executed by a user equipment (UE), cause the UE to: transmit first perception information to a perception-assistance node in communication with a base station serving the UE; and receive first perception-assistance information from the perception-assistance node, the first perception-assistance information determined based at least in part on the first perception information.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
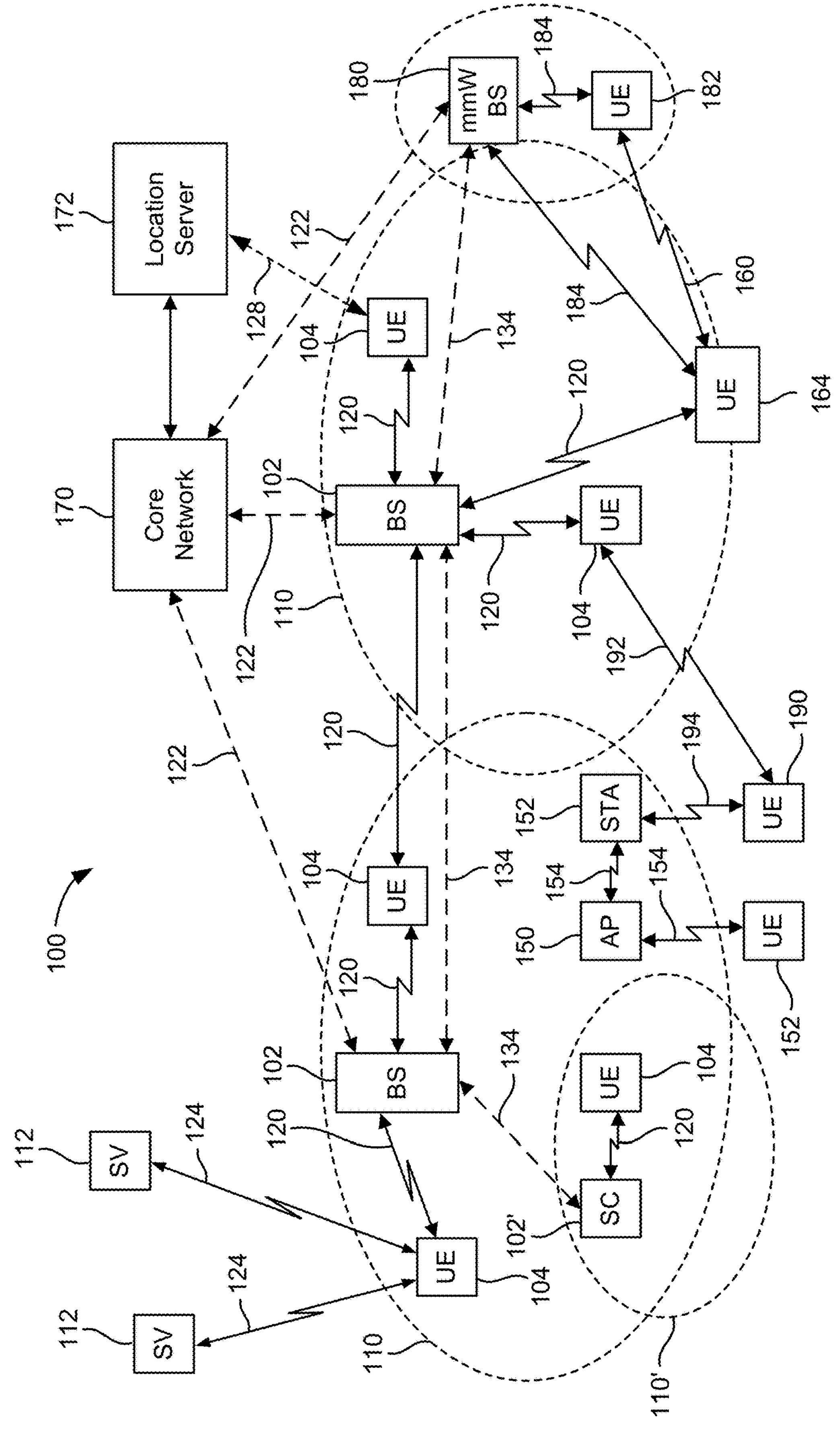
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR)/extended reality (XR) headset, etc.), vehicle (e.g., automobile, motorcycle, bicycle, etc.), Internet of Things (IOT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT." a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (CNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IOT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ).

When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHz). It should be understood that although a portion of FR1 is greater than 6 GHz. FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1. UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
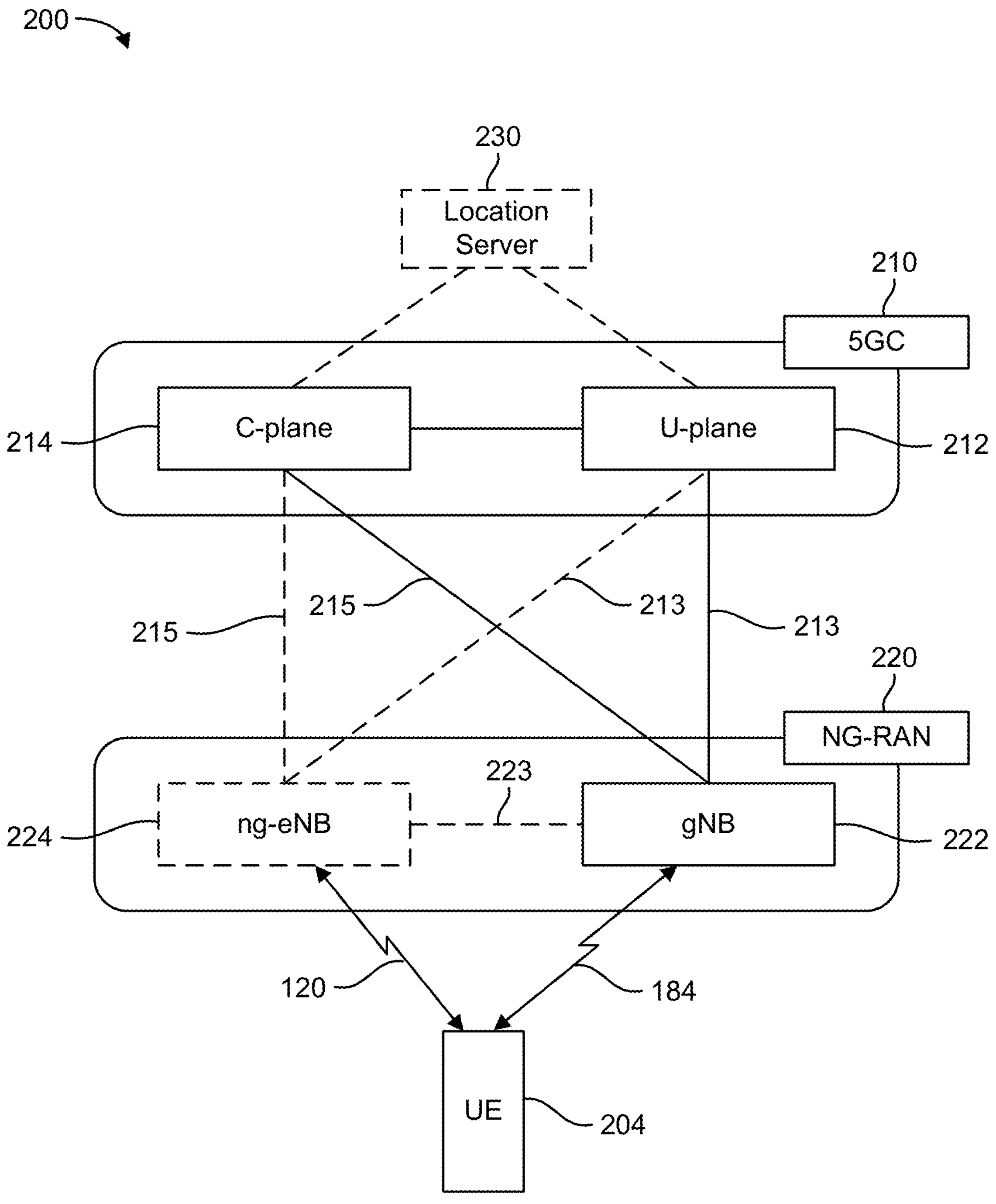
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
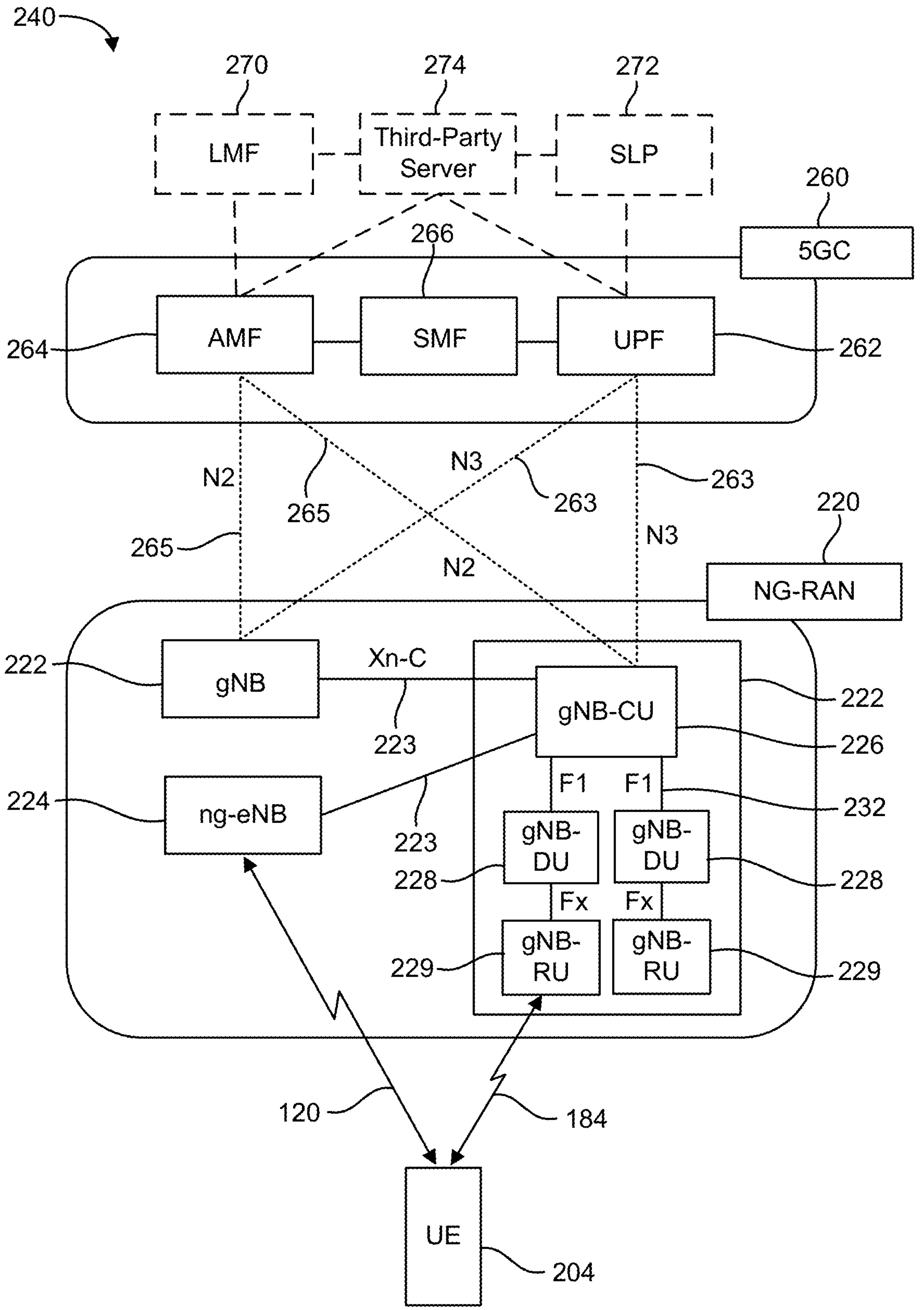

FIG. 2B illustrates another example wireless network structure 240. A 5GC 260 (which may correspond to 5GC

210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU. DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
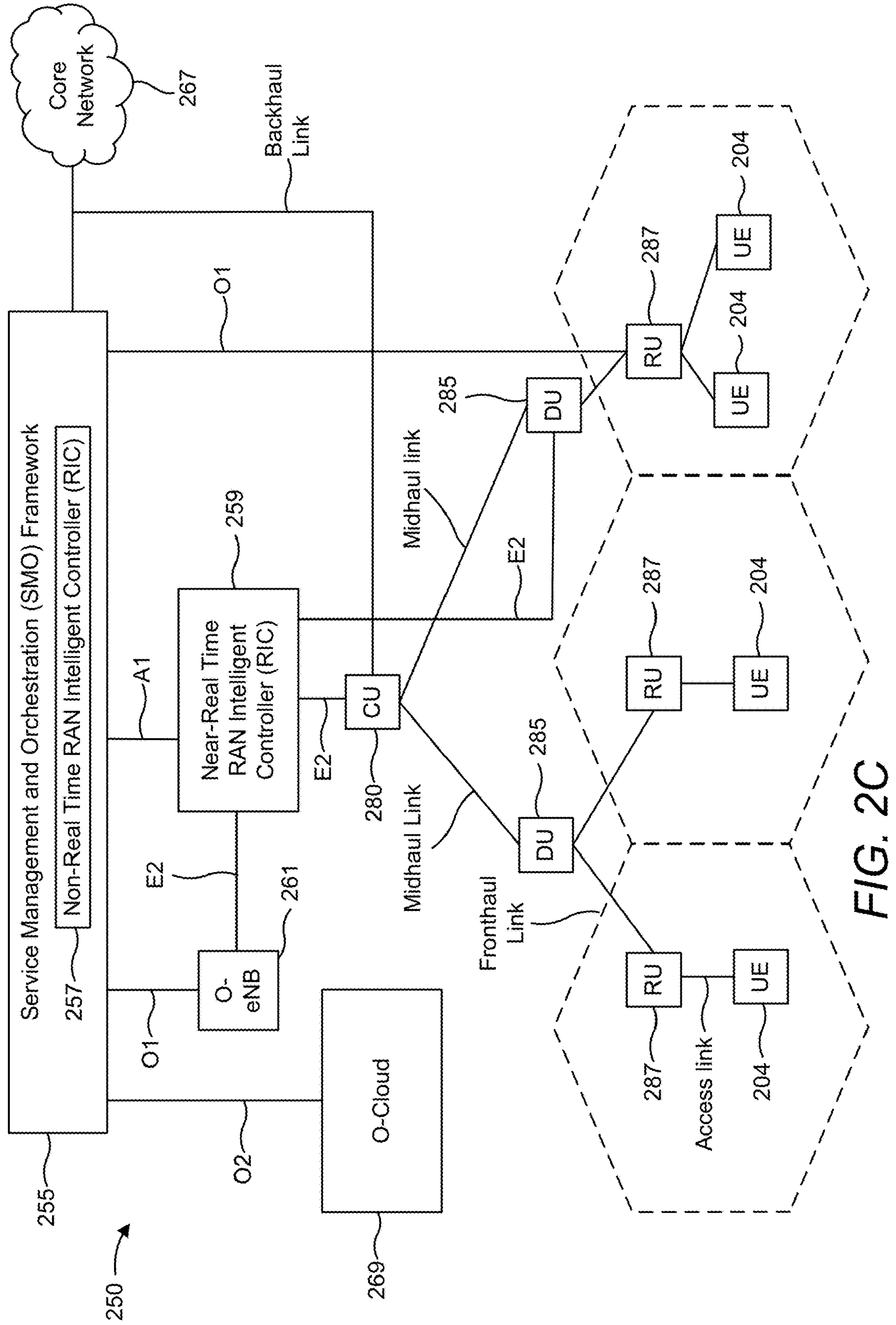

FIG. 2C is a diagram 250 illustrating an example disaggregated base station architecture, according to aspects of the disclosure. The disaggregated base station 250 architecture may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUS 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via 01) or via creation of RAN management policies (such as A1 policies).

Figure 3A:
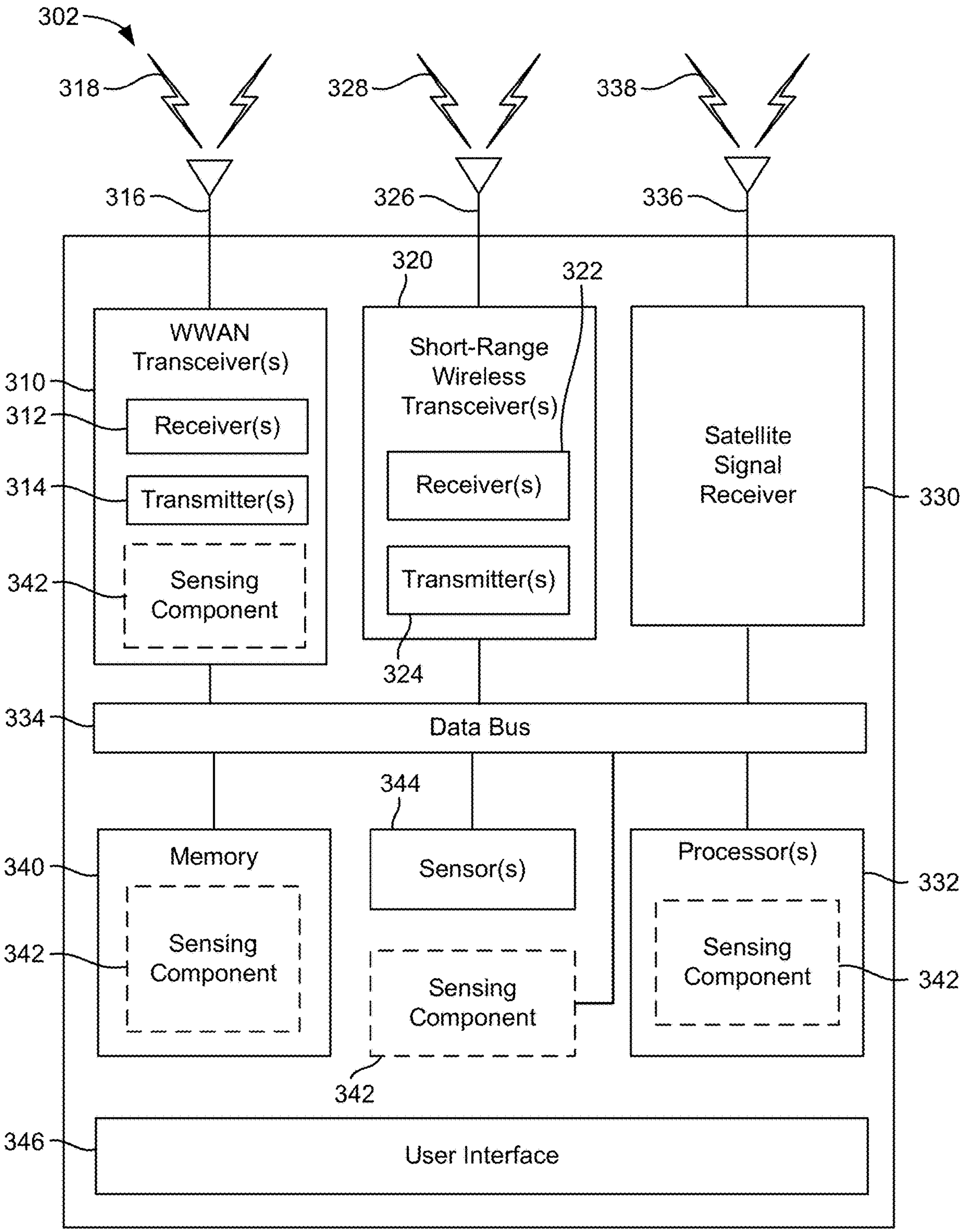
FIGS. 3A, 3B, and 3C are simplified block diagrams of several sample aspects of components that may be employed in a user equipment (UE), a base station, and a network entity, respectively, and configured to support communications as taught herein.
Figure 3B:
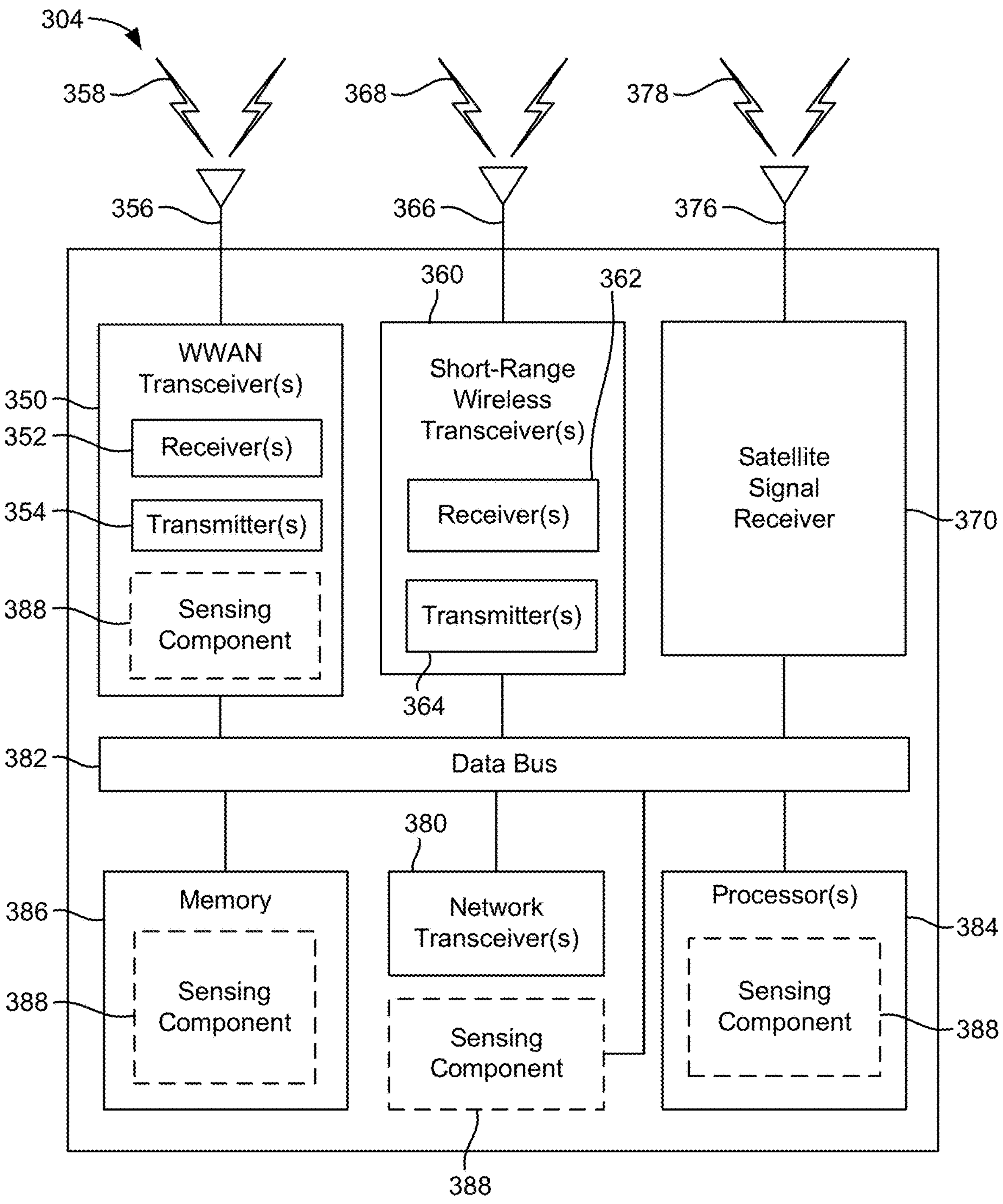
Figure 3C:
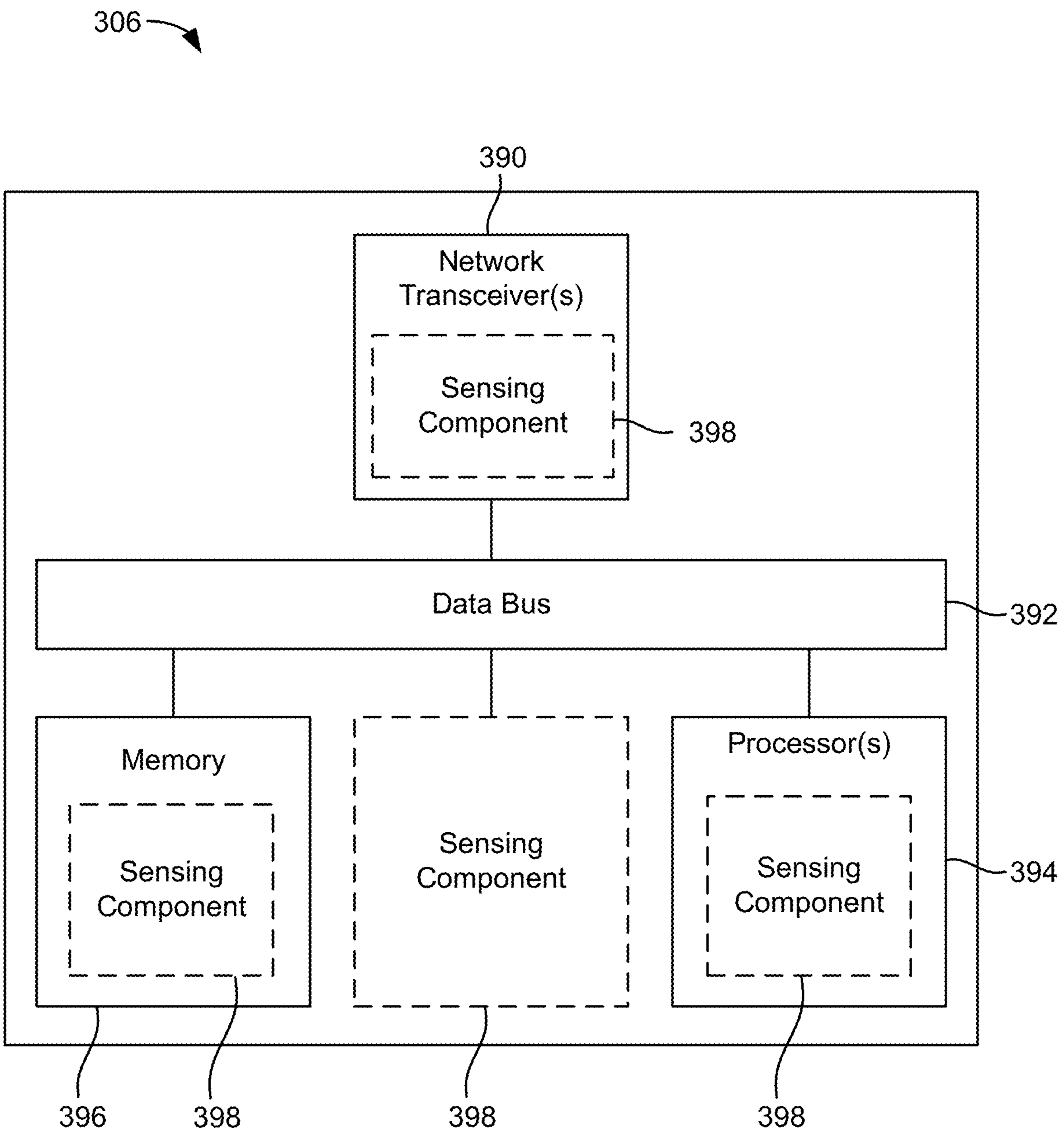

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include sensing component 342, 388, and 398, respectively. The sensing component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the sensing component 342, 388, and 398 may be external to the processors 332, 384, and 394 (e.g., part of a modem processing system, integrated with another processing system, etc.). Alternatively, the sensing component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the sensing component 342, which may be, for example, part of the one or more WWAN transceivers 310, the memory 340, the one or more processors 332, or any combination thereof, or may be a standalone component. FIG. 3B illustrates possible locations of the sensing component 388, which may be, for example, part of the one or more WWAN transceivers 350, the memory 386, the one or more processors 384, or any combination thereof, or may be a standalone component. FIG. 3C illustrates possible locations of the sensing component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging. RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver (s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the sensing component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Wireless communication signals (e.g., RF signals configured to carry OFDM symbols in accordance with a wireless communications standard, such as LTE, NR, etc.) transmitted between a UE and a base station can be used for environment sensing (also referred to as "RF sensing" or "radar"). Using wireless communication signals for environment sensing can be regarded as consumer-level radar with advanced detection capabilities that enable, among other things, touchless/device-free interaction with a device/system. The wireless communication signals may be cellular communication signals, such as LTE or NR signals, WLAN signals, such as Wi-Fi signals, etc. As a particular example, the wireless communication signals may be an OFDM waveform as utilized in LTE and NR. High-frequency communication signals, such as mmW RF signals, are especially beneficial to use as radar signals because the higher frequency provides, at least, more accurate range (distance) detection.

Possible use cases of RF sensing include health monitoring use cases, such as heartbeat detection, respiration rate monitoring, and the like, gesture recognition use cases, such as human activity recognition, keystroke detection, sign language recognition, and the like, contextual information acquisition use cases, such as location detection/tracking, direction finding, range estimation, and the like, and automotive radar use cases, such as smart cruise control, collision avoidance, and the like.

Figure 4A:
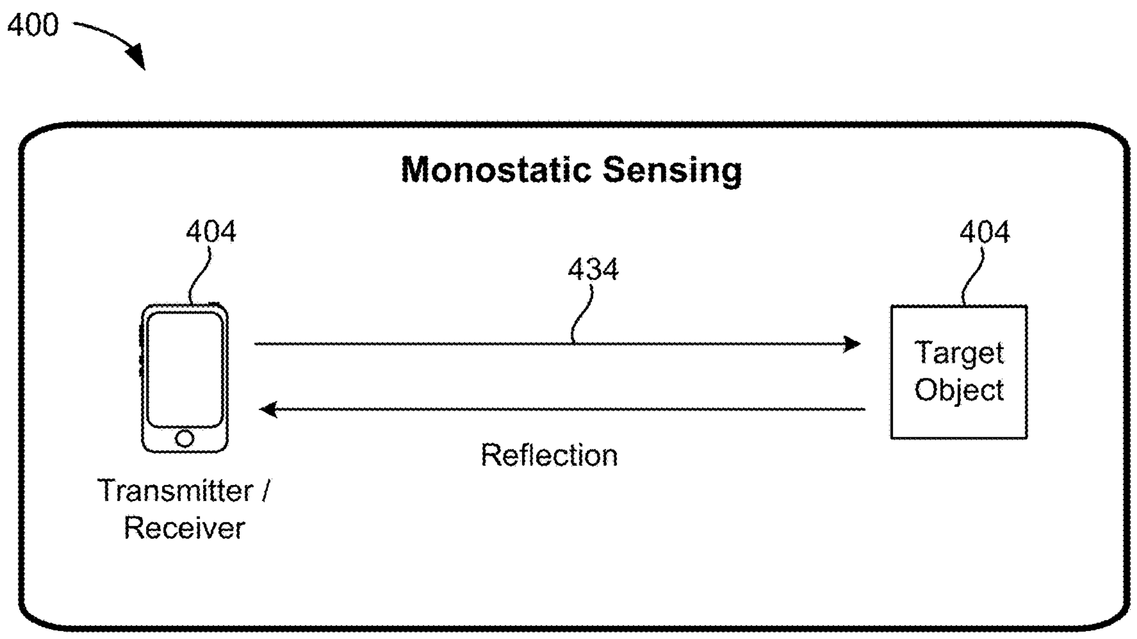
FIGS. 4A and 4B illustrate different types of radar.
Figure 4B:
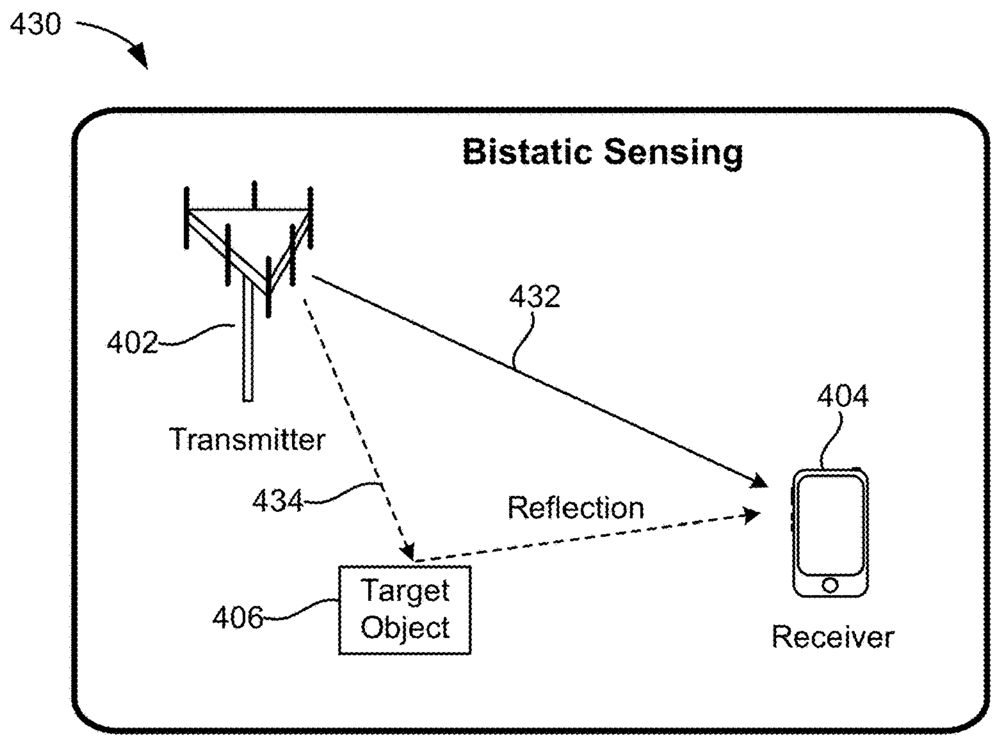

There are different types of sensing, including monostatic sensing (also referred to as "active sensing") and bistatic sensing (also referred to as "passive sensing"). FIGS. 4A and 4B illustrate these different types of sensing. Specifically, FIG. 4A is a diagram 400 illustrating a monostatic sensing scenario and FIG. 4B is a diagram 430 illustrating a bistatic sensing scenario. In FIG. 4A, the transmitter (Tx) and receiver (Rx) are co-located in the same device 404 (e.g., a UE). The sensing device 404 transmits one or more RF sensing signals 434 (e.g., uplink or sidelink positioning reference signals (PRS) where the device 404 is a UE), and some of the RF sensing signals 434 reflect off a target object 406. The sensing device 404 can measure various properties (e.g., times of arrival (ToAs), angles of arrival (AoAs), phase shift, etc.) of the reflections of the RF sensing signals 434 to determine characteristics of the target object 406 (e.g., size, shape, speed, motion state, etc.).

In FIG. 4B, the transmitter (Tx) and receiver (Rx) are not co-located, that is, they are separate devices (e.g., a UE and a base station). Note that while FIG. 4B illustrates using a downlink RF signal as the RF sensing signal 432, uplink RF signals or sidelink RF signals can also be used as RF sensing signals 432. In a downlink scenario, as shown, the transmitter is a base station and the receiver is a UE, whereas in an uplink scenario, the transmitter is a UE and the receiver is a base station.

Referring to FIG. 4B in greater detail, the transmitter device 402 transmits RF sensing signals 432 and 434 (e.g., positioning reference signals (PRS)) to the receiver device 404, but some of the RF sensing signals 434 reflect off a target object 406. The receiver device 404 (also referred to as the "sensing device") can measure the ToAs of the RF sensing signals 432 received directly from the transmitter device and the ToAs of the RF sensing signals 434 reflected from the target object 406.

More specifically, as described above, a transmitter device (e.g., a base station) may transmit a single RF signal or multiple RF signals to a receiver device (e.g., a UE). However, the receiver may receive multiple channel taps corresponding to each transmitted RF signal due to the propagation characteristics of RF signals through multipath channels. Each channel tap may be associated with a cluster of one or more rays and correspond to a multipath that the RF signal followed between the transmitter and the receiver. Thus, a channel tap represents the time of arrival and signal strength of an RF signal over a multipath. Generally, the time at which the receiver detects the first channel tap is considered the ToA of the RF signal on the line-of-sight (LOS) path (i.e., the shortest path between the transmitter and the receiver). Later channel taps are considered to have reflected off objects between the transmitter and the receiver and therefore to have followed non-LOS (NLOS) paths between the transmitter and the receiver.

Thus, referring back to FIG. 4B, the RF sensing signals 432 followed the LOS path between the transmitter device 402 and the receiver device 404, and the RF sensing signals 434 followed an NLOS path between the transmitter device 402 and the receiver device 404 due to reflecting off the target object 406. The transmitter device 402 may have transmitted multiple RF sensing signals 432, 434, some of which followed the LOS path and others of which followed the NLOS path. Alternatively, the transmitter device 402 may have transmitted a single RF sensing signal in a broad enough beam that a portion of the RF sensing signal followed the LOS path (RF sensing signal 432) and a portion of the RF sensing signal followed the NLOS path (RF sensing signal 434).

Based on the ToA of the LOS path, the ToA of the NLOS path, and the speed of light, the receiver device can determine the distance to the target object(s). For example, the receiver device can calculate the distance to the target object as the difference between the ToA of the LOS path and the ToA of the NLOS path multiplied by the speed of light. In addition, if the receiver device is capable of receive beamforming, the receiver device may be able to determine the general direction to a target object as the direction (angle) of the receive beam on which the RF sensing signal following the NLOS path was received. That is, the receiver device may determine the direction to the target object as the angle of arrival (AoA) of the RF sensing signal, which is the angle of the receive beam used to receive the RF sensing signal. The receiver device may then optionally report this information to the transmitter device, its serving base station, an application server associated with the core network, an external client, a third-party application, or some other sensing entity. Alternatively, the receiver device may report the ToA measurements to the transmitter device, or other sensing entity (e.g., if the receiver device does not have the processing capability to perform the calculations itself), and the transmitter device may determine the distance and, optionally, the direction to the target object.

Note that if the RF sensing signals are uplink RF signals transmitted by a UE to a base station, the base station would perform object detection based on the uplink RF signals just like the UE does based on the downlink RF signals.

Figure 5:
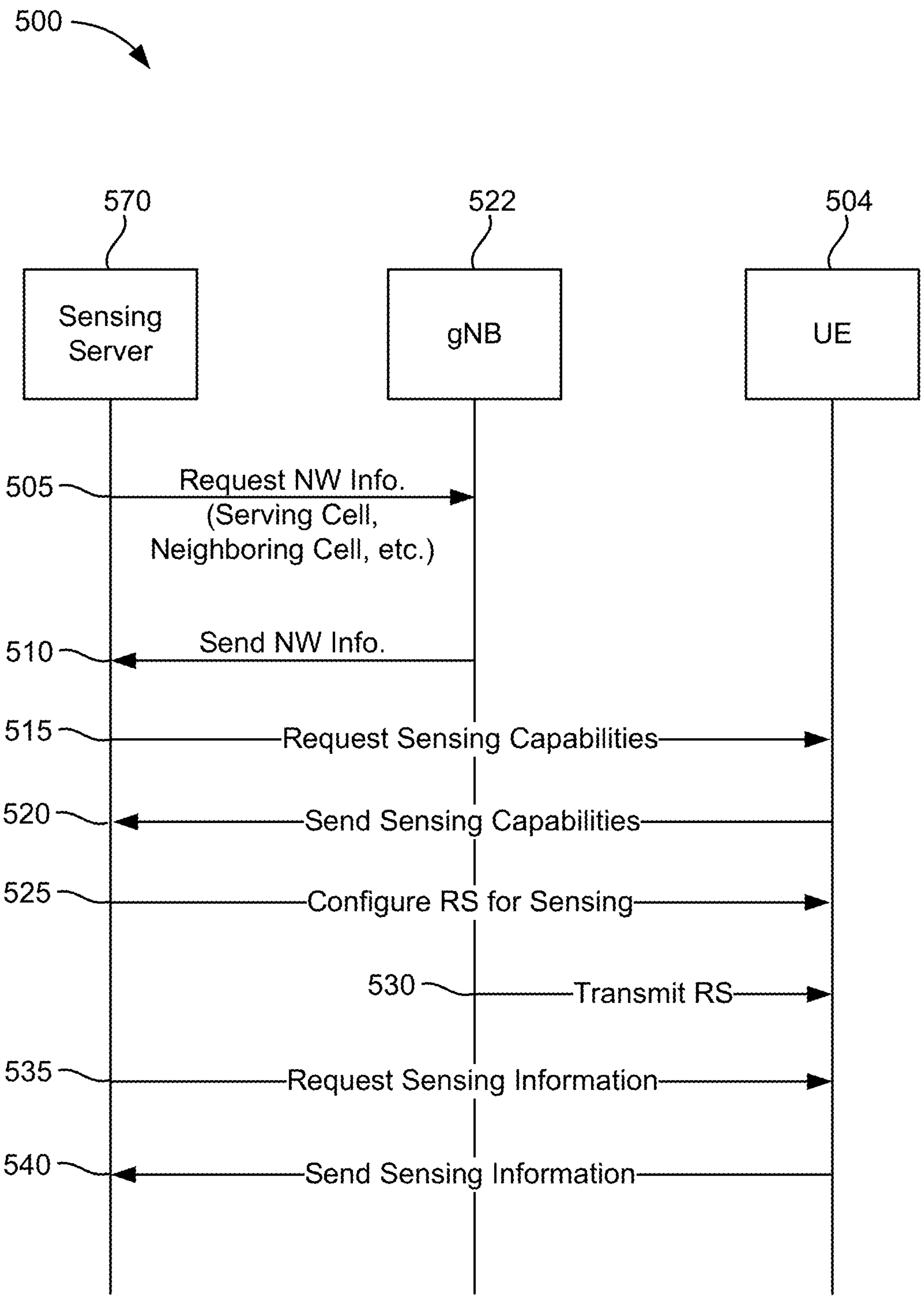
FIG. 5 illustrates an example call flow for a New Radio (NR)-based sensing procedure in which the network configures the sensing parameters, according to aspects of the disclosure.

FIG. 5 illustrates an example call flow 500 for an NR-based sensing procedure (i.e., a bistatic sensing procedure) in which the network configures the sensing parameters, according to aspects of the disclosure. Although FIG. 5 illustrates a network-coordinated sensing procedure, the sensing procedure could be coordinated over sidelink channels. The NR-based sensing procedure may be performed in response to a request from a UE 504 to perform a sensing operation, or may be initiated by the network.

At stage 505, a sensing server 570 (e.g., inside or outside the core network) sends a request for network (NW) information to a gNB 522 (e.g., the serving gNB of the UE 504). The request may be for a list of the UE's 504 serving cell and any neighboring cells. At stage 510, the gNB 522 sends the requested information to the sensing server 570. At stage 515, the sensing server 570 sends a request for sensing capabilities to the UE 504. At stage 520, the UE 504 provides its sensing capabilities to the sensing server 570. At stage 525, the sensing server 570 sends assistance data to the UE 504 indicating the configuration of the reference signals (RS) that will be transmitted for sensing. At stage 530, the serving and/or neighboring cells identified at stage 510 transmit the reference signals for sensing that the UE 504 was configured to measure at stage 525. At stage 535, the sensing server 570 sends a request for sensing information to the UE 504. The UE 504 then measures the transmitted reference signals and, at stage 540, sends the measurements, or any sensing results determined from the measurements, to the sensing server 570. Note that the order of stages 530 and 535 may be reversed or occur substantially simultaneously.

In an aspect, the communication between the UE 504 and the sensing server 570 may be via the LTE positioning protocol (LPP). The communication between the sensing server 570 and the gNB may be via NR positioning protocol type A (NRPPa).

Millimeter wave systems are maturing, with first-generation systems already deployed in the market. Current carrier frequencies of interest are in the 28, 39, and 48 GHz bands, but there is an increased focus on upper millimeter wave (greater than 52.6 GHZ) bands and sub-Terahertz (greater than 114.25 GHz) bands. Based on the availability of these bands, communications for vehicular systems and AR/VR/XR systems have taken prominence as the sixth generation (6G) of cellular communications standards are defined and evolve.

Perception-assisted sensing is also increasingly discussed in these systems to assist with many PHY tasks, such as hybrid beamforming. Typically, the node of interest (e.g., a UE) perceives the environment around it, determines any changes associated with the environment, and reports to, or requests assistance from, the gNB. Multiple variants of such signaling have been considered in the past, as shown in the following table.

TABLE 1

| UE-Based | RAN-Based | XR Server-Based |
| --- | --- | --- |
| UE → RAN: beam management and measurement configuration (BMMC) requests<br>gNB → UE: BMMC updates<br>XR Server ↔ RAN: None | UE-Assisted<br>UE → RAN: L1/L2 pose information<br>gNB → UE: BMMC updates<br>XR Server ↔ RAN: None<br>XR Server-Assisted<br>UE → RAN: None<br>gNB → UE: BMMC updates<br>XR Server → RAN: head-mounted display (HMD) movement information | UE → RAN: None<br>gNB → UE: BMMC updates<br>XR Server ↔ RAN: BMMC requests |

As can be seen from the above table, any changes to the currently defined perception-based techniques would either be internal to the UE or communicated directly to the RAN/gNB.

Given the amount of signaling between a UE and the RAN in perception-based scenarios, it would be beneficial to have an explicit "perception-assistance node" in the perception-based system, especially when there are large numbers of UEs, to avoid overloading the serving base station (gNB). For example, if there are multiple XR players in an indoor setting (e.g., multi-player game halls, theaters, indoor stadia, etc.), it would be beneficial to have one node external to all the players for computational and coordination reasons. As another example, if there are multiple industrial components in an industrial IoT (IIoT) setting, an external coordinating node may be preferrable for robust control, rather than coordinating their control with the RAN/gNB (e.g., for latency reasons). As yet another example, if there are multiple (emergency) vehicles on a roadway, it would be better to coordinate control signaling via a roadside unit (RSU) (the perception-assistance node in this scenario) than with the RAN/gNB. The present disclosure therefore provides techniques for signaling between the UE and such a perception-assistance node.

With specific reference to perception-assisted sensing for vehicular systems, vehicle-aided sensing of the physical world can be used to improve communication. Higher bands (e.g., mmW bands) are more impacted by environmental changes than lower bands. Vehicles and RSUs are good candidates for sensing due to their always "on" sensors, well-known location and orientation, street-level sensing, and reduced constraints in terms of power consumption and/or thermal overheads. There is also a rich set of potential applications for vehicle-aided sensing, such as predictive beam management, handover prediction, predictive rate adaptation, robust RF fingerprinting in dynamic environments, dynamic network management, CSI compression, and the like.

With specific reference to XR systems and pose prediction, perception information (e.g., information from camera (s), gyroscope(s), and/or accelerometer(s)) can assist with pose prediction and corresponding beam management tasks (e.g., beam switching, beamwidth adaptation, beam weight generation, etc.). Pose information may be in terms of three degrees of freedom (3-DOF) or six degrees of freedom (6-DOF). 3-DOF detects rotational movement to determine in which direction the user (i.e., the XR headset or HMD) is looking. 6-DOF detects rotational movement and translational movement to determine where the user is located and in which direction the user is looking. 3-DOF enables the user to look at the virtual world from a fixed point, while 6-DOF additionally enables the user to move freely in the virtual world.

In both vehicular and AR/VR/XR systems, perception-assisted sensing is performed at the device (UE) itself. Perception information collected by the device may be based on sensor information from cameras, radar, lidar, motion sensors (e.g., accelerometers, gyroscope, compass, barometer, etc.), capacitive sensors, and the like. For example, based on the sensor information, the perception information may include beamforming-related information (e.g., adaptive beam weights that have worked best in the last few time slots or frames), the orientation of the device (e.g., relative to a global coordinate system (GCS)), the field-of-view (FOV) of the device, the motion state of the device (e.g., moving, stationary), the periodicity of movement (e.g., in a gaming/industrial setting), the velocity of the device, and the like.

The present disclosure proposes an explicit perception-assistance node in the network that collects perception information from the UE. This node processes the received perception information and can signal, to both the serving base station and the UE, any changes corresponding to environmental variations associated with blockages, signal fading, unexpected changes in reflectors/scatterers, etc. For example, the changes indicated could be changes in the serving beam to be used (at both the base station and the UE), changes in the modulation and coding scheme (MCS), and the like. Other changes could indicate a reduced number of reference signals to be used and/or a search space reduction in the adaptive beam weight calculation.

Figure 6:
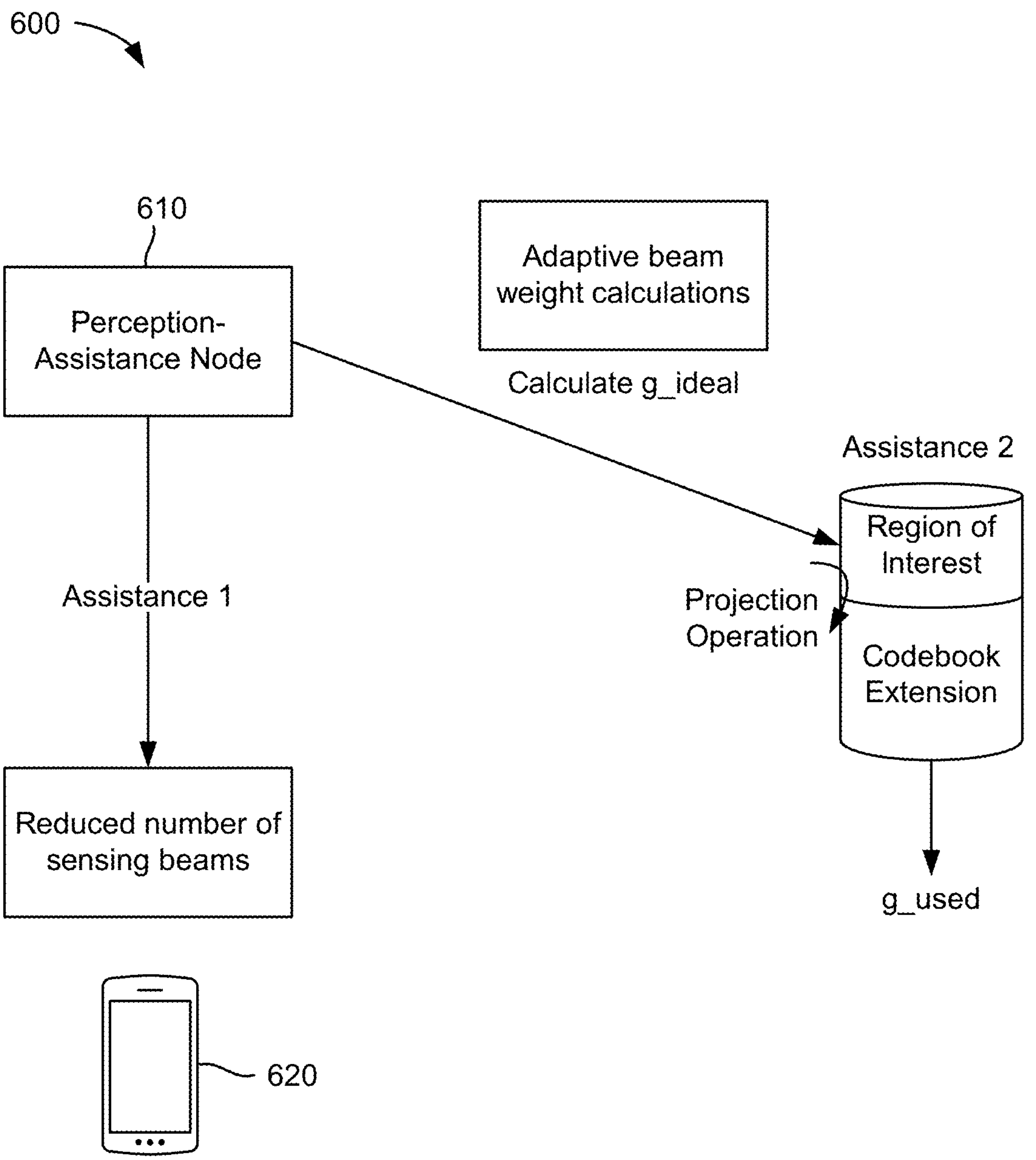
FIG. 6 is a diagram illustrating an example scenario in which a perception-assistance node provides assistance for adaptive beam weight calculations, according to aspects of the disclosure.

FIG. 6 is a diagram 600 illustrating an example scenario in which a perception-assistance node 610 provides assistance for adaptive beam weight calculations, according to aspects of the disclosure. Premium-tier UEs, such as the UE 620 depicted in FIG. 6, have antenna modules on different sides of the UE (e.g., four antenna modules), whereas lower tier UEs may only have one or two antenna modules. The different antenna modules may permit a UE to beamform (transmit or receive) in different directions with good gains. For example, the UE 620 may use beamforming for radar-based environment sensing, as described above with reference to FIGS. 4A, 4B, and 5. Premium-tier UEs may also have a lidar sensor for environment sensing.

Beam establishment, beam switching, and/or beam recovery may be based on adaptive beam weight learning. The basic concept behind the generation and tracking of adaptive (dynamic) beam weights has a few constituent steps. First, a specific set of beam weights (that are a priori designed with a specific objective) are used for channel sounding. Channel sounding is a technique that evaluates the radio environment for wireless communication based on the reception/measurement of certain reference signals, such as SSBs and/or channel state information reference signals (CSI-RS). Second, the receiver (e.g., the UE 620) measures the RSRPs of the reference signals received with the set of beam weights (phase measurements are generally not possible due to stability issues). Third, the beam weights to use for reception are determined (learned). These beam weights are also typically used for transmission as well. Fourth, the beam weights are updated (adapted) as the channel environment changes (e.g., due to blockage, fading, etc.).

As noted above, perception information includes information obtained from radar, lidar, camera, and/or motion sensors. To assist a UE 620 with adaptive beam weight calculations (e.g., for sensing) to determine a reduced number of sensing beams, the orientation of the UE 620 should be known. This can be obtained from motion sensors, such as the UE's 620 gyroscope and accelerometers. Based on the orientation of the UE 620 provided to the perception-assistance node 610, the perception-assistance node 610 can determine which beams, and therefore antenna module(s), the UE 620 should use, thereby permitting the UE 620 to turn off or refrain from using the other beams/antenna module(s). As shown in FIG. 6, the perception-assistance node 610 provides assistance data to the UE 620 (labeled "Assistance 1") indicating the reduced number of sensing beams, and thereby the reduced number of antenna modules. In addition to the orientation of the UE 620, to determine the reduced set of beams, the perception-assistance node 610 can perform a projection operation based on the region of interest over which to determine adaptive beam weights for the sensing operation. As will be appreciated, selectively beamforming using certain antenna modules instead of all the antenna modules can improve power consumption and thermal properties of the UE 620.

Figure 7:
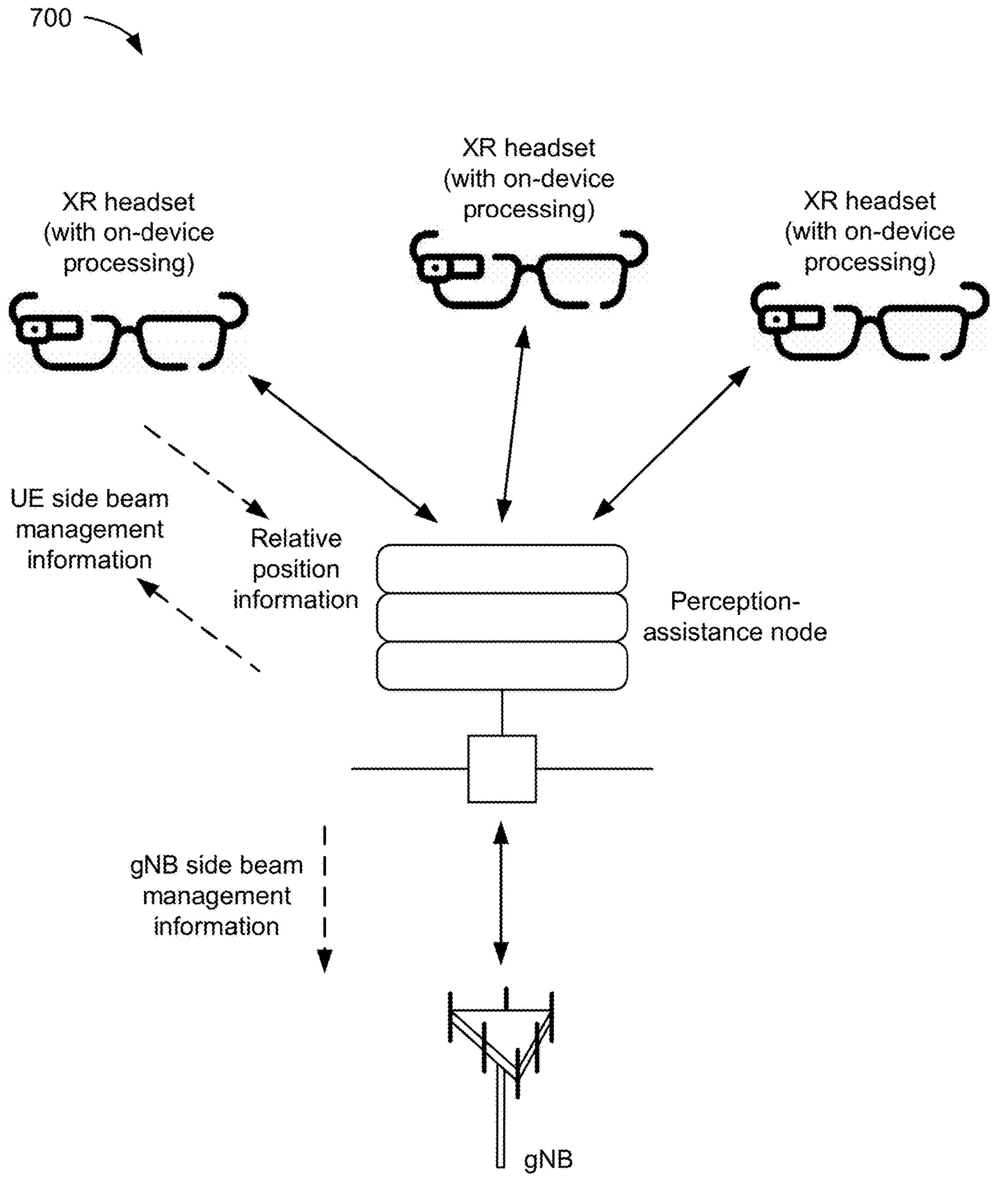
FIG. 7 is a diagram illustrating an example of a perception-assistance node enabling the signaling of beamforming aspects to both UEs and a base station, according to aspects of the disclosure.

FIG. 7 is a diagram 700 illustrating an example of a perception-assistance node enabling the signaling of beamforming aspects to both UEs and a base station, according to aspects of the disclosure. In the example of FIG. 7, the perception-assistance node is in communication with a base station and multiple XR headsets (UEs). As will be appreciated, although FIG. 7 illustrates three XR headsets, there may be more or fewer than three XR headsets. Similarly, while FIG. 7 illustrates the UEs as XR headsets, as will be appreciated, the UEs may be other types of UEs.

As shown in FIG. 7, the XR headsets may provide relative position information (i.e., perception information) to the perception-assistance node, which may in turn provide UE side beam management information to the XR headsets. The perception-assistance node may also provide base station side beam management information to the gNB with which the XR headsets are communicating. The UE side and base station side beam management information may enable the XR headsets and the base station (illustrated as a gNB) to more efficiently beamform towards each other (e.g., reduce the number of beams, reduce the search space, reduce beam sweeping time, and/or the like).

As shown in FIG. 7, the perception-assistance node is separate from the base station so as to not overload the base station with perception information. For example, the perception-assistance node may be a wireless device, similar to a base station or access point, located at the venue in which the XR headsets (or other UEs) are located. However, the perception-assistance node may also be a different logical entity located at the base station itself.

In addition, the XR headsets (or other UEs) may only send perception information to the perception-assistance node—all other types of signaling between the XR headsets and the base station would be the same. As such, each XR headset would communicate with (have an active communication session with) both the perception-assistance node and the base station. The XR headsets (or other UEs) and the perception-assistance node may communicate via RRC, MAC control element (MAC-CE), downlink control information (DCI), and/or uplink control information (UCI). Which type of signaling may depend on the latency requirements of the communication session, with lower latency sessions using lower layer signaling (e.g., MAC-CEs, DCI, UCI).

In an aspect, instead of having a dedicated perception-assistance node, a UE could send perception information to a location server (e.g., location management functionality or an LMF), which would in turn send perception-assistance information back to the UE and/or to the UE's serving base station. This perception-assistance information may assist angle-based positioning procedures, such as downlink angle-of-departure (DL-AoD) and uplink angle-of-arrival (AoA) procedures. There are a number of base station-side angle estimation approaches, but UE-side angle estimation approaches have not yet been standardized at the 3GPP level.

Figure 8:
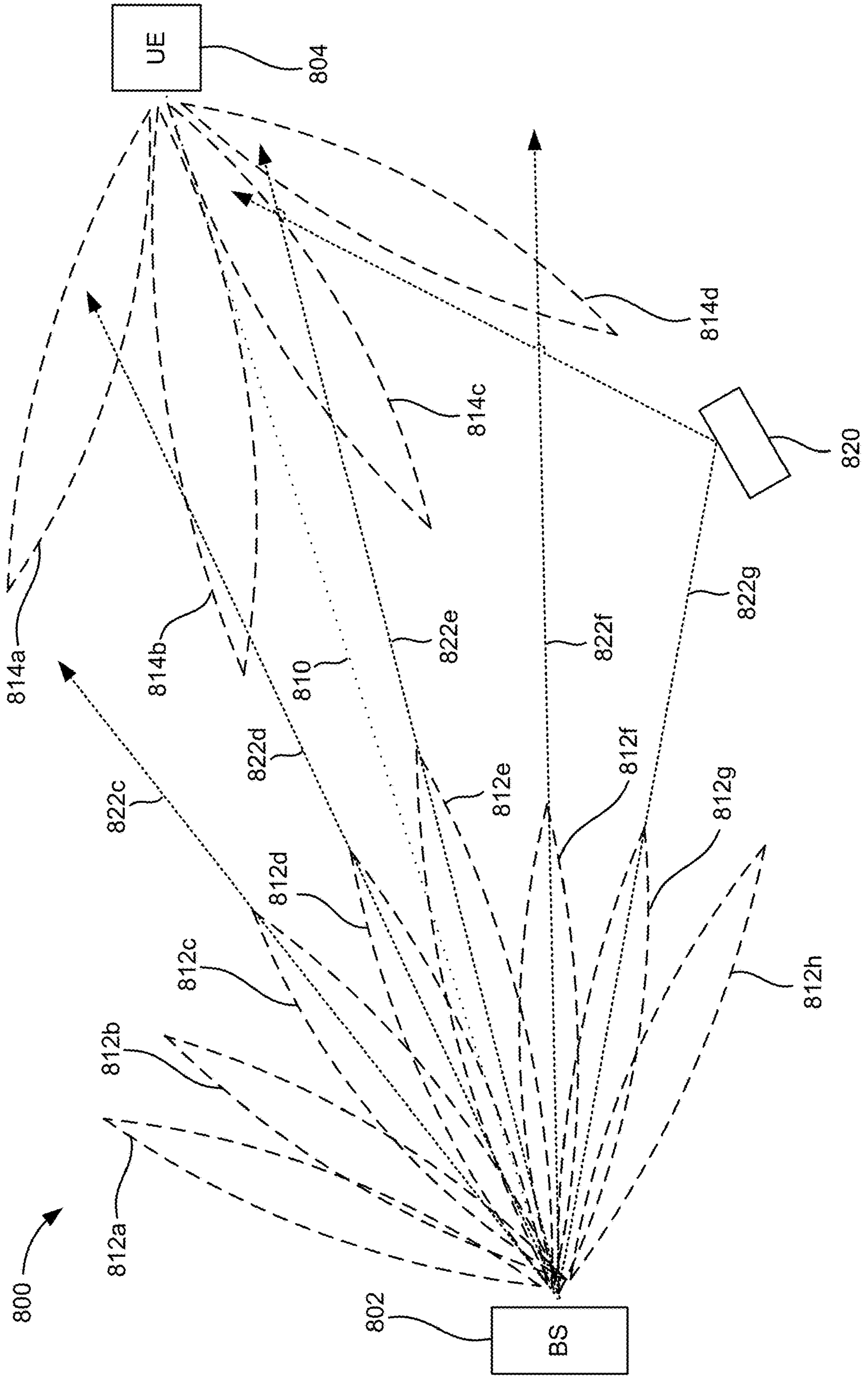
FIG. 8 is a diagram illustrating an example base station in communication with an example UE, according to aspects of the disclosure.

FIG. 8 is a diagram 800 illustrating a base station (BS) 802 (which may correspond to any of the base stations described herein) in communication with a UE 804 (which may correspond to any of the UEs described herein), according to aspects of the disclosure. Referring to FIG. 8, the base station 802 may transmit a beamformed signal to the UE 804 on one or more transmit beams 812*a*, 812*b*, 812*c*. 812*d*, 812*e*, 812*f*, 812*g*, 812*h* (collectively, beams 812), each having a beam identifier that can be used by the UE 804 to identify the respective beam. Where the base station 802 is beamforming towards the UE 804 with a single array of antennas (e.g., a single TRP/cell), the base station 802 may perform a "beam sweep" by transmitting first beam 812*a*, then beam 812*b*, and so on until lastly transmitting beam 812*h*. Alternatively, the base station 802 may transmit beams 812 in some pattern, such as beam 812*a*, then beam 812*h*, then beam 812*b*, then beam 812*g*, and so on. Where the base station 802 is beamforming towards the UE 804 using multiple arrays of antennas (e.g., multiple TRPs/cells), each antenna array may perform a beam sweep of a subset of the beams 812. Alternatively, each of beams 812 may correspond to a single antenna or antenna array.

FIG. 8 further illustrates the paths 822*c*. 822*d*, 822*c*, 822*f*, and 822*g* followed by the beamformed signal transmitted on beams 812*c*. 812*d*, 812*e*, 812*f*, and 812*g*, respectively. Each path 822*c*, 822*d*, 822*e*, 822*f*, 822*g* may correspond to a single "multipath" or, due to the propagation characteristics of radio frequency (RF) signals through the environment, may be comprised of a plurality (a cluster) of "multipaths." Note that although only the paths 822*c*-822*g* for beams 812*c*-812*g* are shown, this is for simplicity, and the signal transmitted on each of beams 812 will follow some path. In the example shown, the paths 822*c*, 822*d*, 822*e*, and 822*f* are straight lines, while path 822*g* reflects off an obstacle 820 (e.g., a building, vehicle, terrain feature, etc.).

The UE 804 may receive the beamformed signal from the base station 802 on one or more receive beams 814*a*, 814*b*, 814*c*, 814*d* (collectively, beams 814). Note that for simplicity, the beams illustrated in FIG. 8 represent either transmit beams or receive beams, depending on which of the base station 802 and the UE 804 is transmitting and which is receiving. Thus, the UE 804 may also transmit a beamformed signal to the base station 802 on one or more of the beams 814, and the base station 802 may receive the beamformed signal from the UE 804 on one or more of the beams 812.

In an aspect, the base station 802 and the UE 804 may perform beam training to align the transmit and receive beams of the base station 802 and the UE 804. For example, depending on environmental conditions and other factors, the base station 802 and the UE 804 may determine that the best transmit and receive beams are 812*d* and 814*b*, respectively, or beams 812*e* and 814*c*, respectively. The direction of the best transmit beam for the base station 802 may or may not be the same as the direction of the best receive beam, and likewise, the direction of the best receive beam for the UE 804 may or may not be the same as the direction of the best transmit beam. Note, however, that aligning the transmit and receive beams is not necessary to perform a DL-AoD or UL-AoA positioning procedure.

To perform a DL-AoD positioning procedure, the base station 802 may transmit reference signals (e.g., PRS) to the UE 804 on one or more of beams 812, with each beam having a different transmit angle. The different transmit angles of the beams will result in different received signal strengths (e.g., RSRP, RSRQ. SINR, etc.) at the UE 804. Specifically, the received signal strength will be lower for transmit beams 812 that are further from the line of sight (LOS) path 810 between the base station 802 and the UE 804 than for transmit beams 812 that are closer to the LOS path 810.

In the example of FIG. 8, if the base station 802 transmits reference signals to the UE 804 on beams 812*c*. 812*d*, 812*e*, 812*f*, and 812*g*, then transmit beam 812*e* is best aligned with the LOS path 810, while transmit beams 812*c*, 812*d*, 812*f*, and 812*g* are not. As such, beam 812*e* is likely to have a higher received signal strength at the UE 804 than beams 812*c*, 812*d*, 812*f*, and 812*g*. Note that the reference signals transmitted on some beams (e.g., beams 812*c* and/or 812*f*) may not reach the UE 804, or energy reaching the UE 804 from these beams may be so low that the energy may not be detectable or at least can be ignored.

The UE 804 can report the received signal strength, and optionally, the associated measurement quality, of each measured transmit beam 812*c*-812*g* to the base station 802, or alternatively, the identity of the transmit beam having the highest received signal strength (beam 812*e* in the example of FIG. 8). Alternatively or additionally, if the UE 804 is also engaged in a round-trip-time (RTT) or time-difference of arrival (TDOA) positioning session with at least one base station 802 or a plurality of base stations 802, respectively, the UE 804 can report reception-to-transmission (Rx-Tx) time difference or reference signal time difference (RSTD) measurements (and optionally the associated measurement qualities), respectively, to the serving base station 802 or other positioning entity (e.g., a location server). In any case, the positioning entity (e.g., the base station 802, a location server, a third-party client, UE 804, etc.) can estimate the angle from the base station 802 to the UE 804 as the AoD of the transmit beam having the highest received signal strength at the UE 804, here, transmit beam 812*c*.

In one aspect of DL-AoD-based positioning, where there is only one involved base station 802, the base station 802 and the UE 804 can perform a round-trip-time (RTT) procedure to determine the distance between the base station 802 and the UE 804. Thus, the positioning entity can determine both the direction to the UE 804 (using DL-AoD positioning) and the distance to the UE 804 (using RTT positioning) to estimate the location of the UE 804. Note that the AoD of the transmit beam having the highest received signal strength does not necessarily lie along the LOS path 810, as shown in FIG. 8. However, for DL-AoD-based positioning purposes, it is assumed to do so.

In another aspect of DL-AoD-based positioning, where there are multiple involved base stations 802, each involved base station 802 can report, to the serving base station 802, the determined AoD from the respective base station 802 to the UE 804, or the RSRP measurements. The serving base station 802 may then report the AoDs or RSRP measurements from the other involved base station(s) 812 to the positioning entity (e.g., UE 804 for UE-based positioning or a location server for UE-assisted positioning). With this information, and knowledge of the base stations' 802 geographic locations, the positioning entity can estimate a location of the UE 804 as the intersection of the determined AoDs. There should be at least two involved base stations 802 for a two-dimensional (2D) location solution, but as will be appreciated, the more base stations 802 that are involved in the positioning procedure, the more accurate the estimated location of the UE 804 will be.

Note that where the UE reports the measured RSRPs to a positioning entity on the network side (e.g., a location server), the positioning procedure is referred to as a "UE-assisted" positioning procedure. Where the UE is the positioning entity, and therefore does not report anything, the positioning procedure is referred to as a "UE-based" positioning procedure. In this case, the UE receives assistance data indicating the beam shapes used to transmit the downlink reference signals. Currently, only a beam's boresight direction is indicated to the UE. However, more detailed beam related parameters (e.g., array gain pattern as a function of spatial angles) may also be indicated in some cases.

To perform an UL-AoA positioning procedure, the UE 804 transmits uplink reference signals (e.g., UL-PRS, SRS, etc.) to the base station 802 on one or more of uplink transmit beams 814. The base station 802 receives the uplink reference signals on one or more of uplink receive beams 812. The base station 802 determines the angle of the best receive beams 812 used to receive the one or more reference signals from the UE 804 as the AoA from the UE 804 to itself. Specifically, each of the receive beams 812 will result in a different received signal strength (e.g., RSRP, RSRQ. SINR, etc.) of the one or more reference signals at the base station 802. Further, the channel impulse response of the one or more reference signals will be smaller for receive beams 812 that are further from the actual LOS path 810 between the base station 802 and the UE 804 than for receive beams 812 that are closer to the LOS path 810. Likewise, the received signal strength will be lower for receive beams 812 that are further from the LOS path 810 than for receive beams 812 that are closer to the LOS path 810. As such, the base station 802 identifies the receive beam 812 that results in the highest received signal strength and, optionally, the strongest channel impulse response, and estimates the angle from itself to the UE 804 as the AoA of that receive beam 812. Note that as with DL-AoD-based positioning, the AoA of the receive beam 812 resulting in the highest received signal strength (and strongest channel impulse response if measured) does not necessarily lie along the LOS path 810. However, for UL-AoA-based positioning purposes in FR2, it may be assumed to do so.

Where the UE 804 is estimating its location (i.e., the UE is the positioning entity), it may need to obtain the geographic location of the base station 802. The UE 804 may obtain the location from, for example, the base station 802 itself or a location server (e.g., location server 230, LMF 270, SLP 272). With the knowledge of the distance to the base station 802 (based on the RTT or timing advance), the angle between the base station 802 and the UE 804 (based on the UL-AoA of the best receive beam 812), and the known geographic location of the base station 802, the UE 804 can estimate its location.

Alternatively, where a positioning entity, such as the base station 802 or a location server, is estimating the location of the UE 804, the base station 802 reports (to the location server or to the UE to forward to the location server) the AoA of the receive beam 812 resulting in the highest received signal strength (and optionally strongest channel impulse response) of the reference signals received from the UE 804, or all received signal strengths and channel impulse responses for all receive beams 812 (which allows the positioning entity to determine the best receive beam 812). The estimated AoA may be reported to the location server in either a global coordinate system (GCS) or a local coordinate system (LCS). The reporting can also be different for azimuth and elevation. The base station 802 may additionally report the Rx-Tx time difference to the UE 804. The positioning entity can then estimate the location of the UE 804 based on the UE's 804 distance to the base station 802, the AoA of the identified receive beam 812, and the known geographic location of the base station 802.

Note that while the UE 804 is illustrated as being capable of beamforming, this is not necessary for DL-AoD and UL-AoA positioning procedures. Rather, the UE 804 may receive and transmit on an omni-directional antenna.

Figure 9:
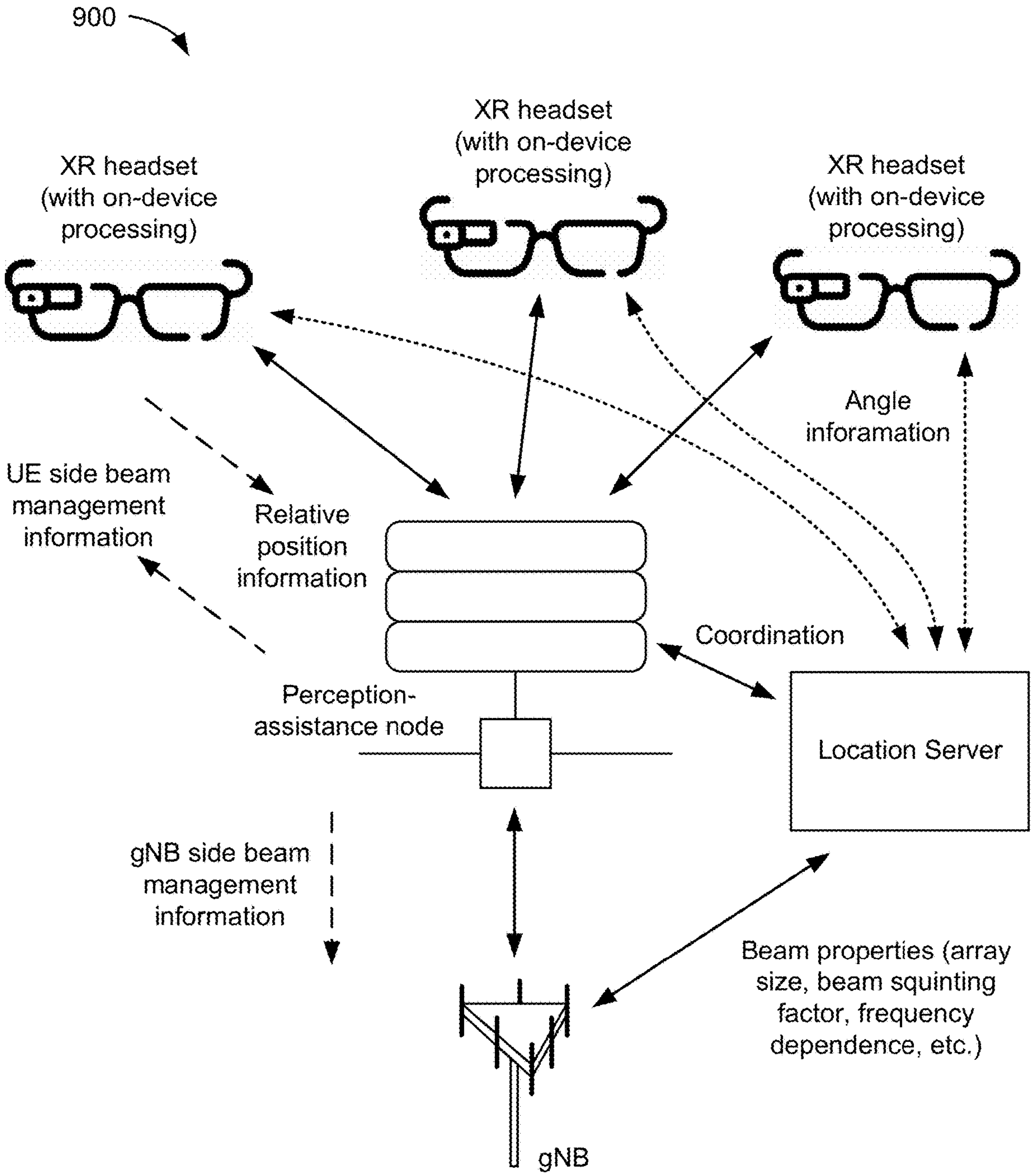
FIG. 9 is a diagram illustrating an example of signaling between a perception-assistance node and a location server to enable the signaling of beamforming aspects to both UEs and a base station, according to aspects of the disclosure.

FIG. 9 is a diagram 900 illustrating an example of signaling between a perception-assistance node and a location server to enable the signaling of beamforming aspects to both UEs and a base station, according to aspects of the disclosure. In the example of FIG. 9, the perception-assistance node is in communication with a base station and multiple XR headsets (UEs). As will be appreciated, although FIG. 9 illustrates three XR headsets, there may be more or fewer than three XR headsets. Similarly, while FIG. 9 illustrates the UEs as XR headsets, as will be appreciated, the UEs may be other types of UEs.

As shown in FIG. 9, the XR headsets may provide relative position information (i.e., perception information) to the perception-assistance node, which may in turn provide UE side beam management information to the XR headsets. The perception-assistance node may also provide base station side beam management information to the gNB with which the XR headsets are communicating. The UE side and base station side beam management information may enable the XR headsets and the base station (illustrated as a gNB) to more efficiently beamform towards each other (e.g., reduce the number of beams, reduce the search space, reduce beam sweeping time, and/or the like).

In addition, or alternatively, the XR headsets may also provide perception information (e.g., angle information) to a location server (e.g., for a DL-AoD positioning procedure or an UL-AoA positioning procedure). The perception information may be the same as or different than the perception information provided to the perception-assistance node. The perception-assistance node and the location server may exchange coordination information (e.g., which beams are used in different symbols, etc.), and the location server may send the base station beam property information, such as array size, beam squinting factor (i.e., how beams perform as a function of wide bandwidth/frequency support), frequency dependence, etc.

Note that while FIG. 9 illustrates both a perception-assistance node and a location server, only the location server may be present and perform the operations of the perception-assistance node described herein. Alternatively, the perception-assistance node and the location server may both be present and share the provision of perception-assistance information.

The signaling between the XR headsets and the location server may be LPP signaling, and the signaling between the location server and the base station may be NRPPa signaling. The signaling between the perception-assistance node and the location server may depend on the type of device the perception-assistance node is (e.g., NRPPa if the perception-assistance node is a type of base station or access point).

Figure 10:
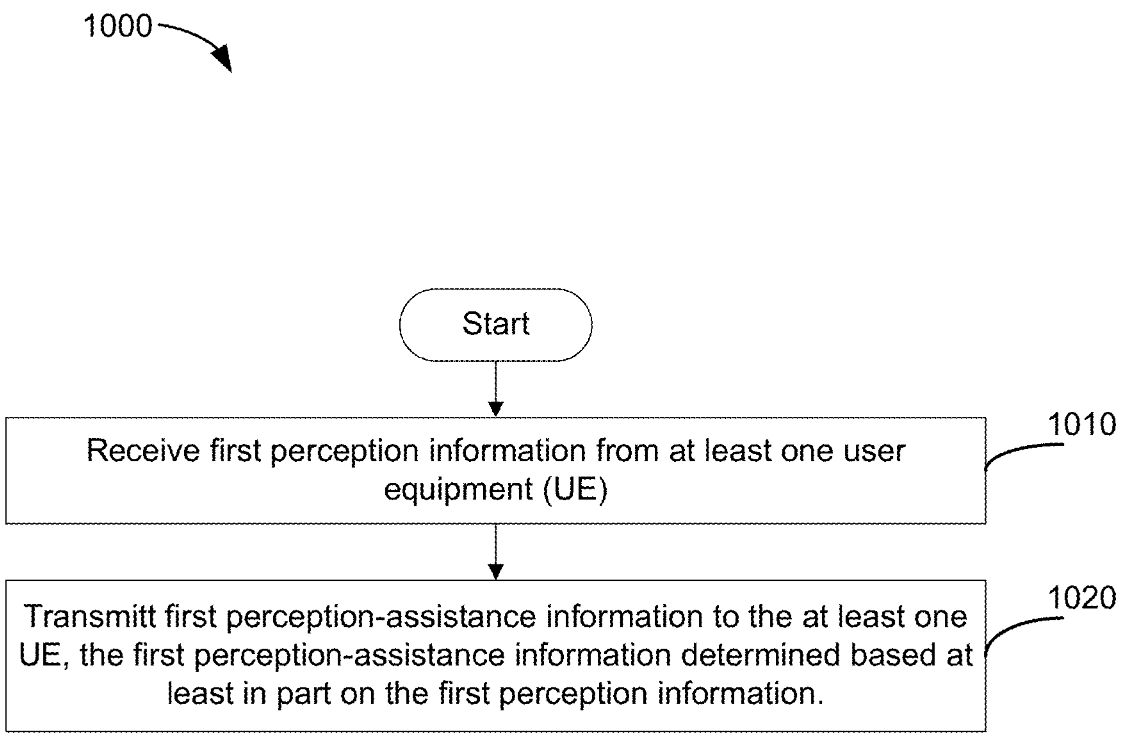
FIGS. 10 and 11 illustrate example methods of wireless communication, according to aspects of the disclosure.

FIG. 10 illustrates an example method 1000 of wireless communication, according to aspects of the disclosure. In an aspect, method 1000 may be performed by a network node (e.g., a perception-assistance node or a location server).

At 1010, the network node receives first perception information from at least one UE. In an aspect, where the network node is a perception-assistance node, operation 1010 may be performed by the one or more WWAN transceivers 350, the one or more short-range wireless transceivers 360, the one or more processors 384, memory 386, and/or sensing component 388, any or all of which may be considered means for performing this operation. In an aspect, where the network node is a location server, operation 1010 may be performed by the one or more network transceivers 390, the one or more processors 394, memory 396, and/or sensing component 398, any or all of which may be considered means for performing this operation.

At 1020, the network node transmits first perception-assistance information to the at least one UE, the first perception-assistance information determined based at least in part on the first perception information. In an aspect, where the network node is a perception-assistance node, operation 1020 may be performed by the one or more WWAN transceivers 350, the one or more short-range wireless transceivers 360, the one or more processors 384, memory 386, and/or sensing component 388, any or all of which may be considered means for performing this operation. In an aspect, where the network node is a location server, operation 1020 may be performed by the one or more network transceivers 390, the one or more processors 394, memory 396, and/or sensing component 398, any or all of which may be considered means for performing this operation.

Figure 11:
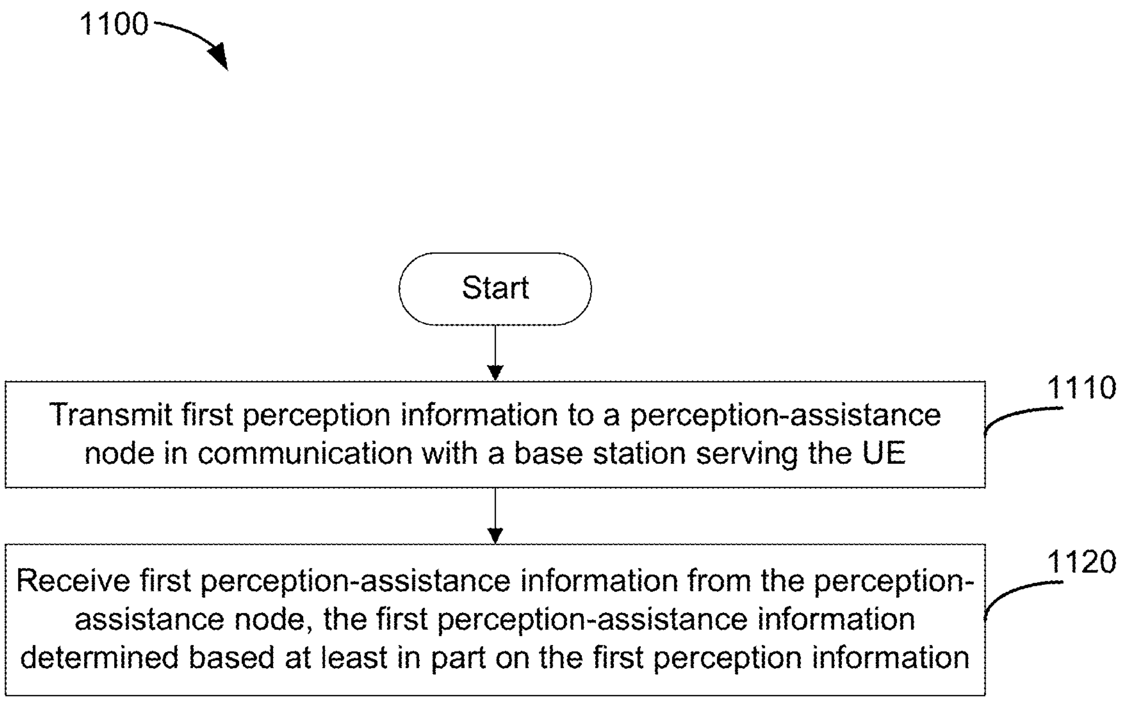

FIG. 11 illustrates an example method 1100 of wireless communication, according to aspects of the disclosure. In an aspect, method 1100 may be performed by a UE (e.g., any of the UEs described herein).

At 1110, the UE transmits first perception information to a perception-assistance node in communication with a base station serving the UE. In an aspect, operation 1110 may be performed by the one or more WWAN transceivers 310, the one or more short-range wireless transceivers 320, the one or more processors 332, memory 340, and/or sensing component 342, any or all of which may be considered means for performing this operation.

At 1120, the UE receives first perception-assistance information from the perception-assistance node, the first perception-assistance information determined based at least in part on the first perception information. In an aspect, operation 1120 may be performed by the one or more WWAN transceivers 310, the one or more short-range wireless transceivers 320, the one or more processors 332, memory 340, and/or sensing component 342, any or all of which may be considered means for performing this operation.

As will be appreciated, a technical advantage of the methods 1000 and 1100 is improved perception-based operation.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a network node, comprising: receiving first perception information from at least one user equipment (UE); and transmitting first perception-assistance information to the at least one UE, the first perception-assistance information determined based at least in part on the first perception information.

Clause 2. The method of clause 1, wherein the network node is a perception-assistance node.

Clause 3. The method of clause 2, wherein the perception-assistance node: is physically separate from a base station, or a logical entity within a base station.

Clause 4. The method of any of clauses 2 to 3, further comprising: receiving second perception information from a base station serving the at least one UE.

Clause 5. The method of clause 4, wherein the first perception-assistance information is further determined based on the second perception information.

Clause 6. The method of any of clauses 4 to 5, further comprising: transmitting second perception-assistance information to the base station, the second perception-assistance information determined based at least in part on the first perception information, the second perception information, or both.

Clause 7. The method of any of clauses 2 to 6, wherein the first perception information is received from the at least one UE via: radio resource control (RRC) signaling, medium access control control elements (MAC-CEs) signaling, or uplink control information (UCI).

Clause 8. The method of any of clauses 2 to 7, wherein the first perception-assistance information is transmitted to the at least one UE via: radio resource control (RRC) signaling, medium access control control elements (MAC-CEs) signaling, or downlink control information (DCI).

Clause 9. The method of any of clauses 1 to 8, wherein the network node is a location server.

Clause 10. The method of clause 9, further comprising: receiving second perception information from a perception-assistance node in communication with the at least one UE and a base station serving the at least one UE.

Clause 11. The method of clause 10, wherein the first perception-assistance information is further determined based on the second perception information.

Clause 12. The method of any of clauses 9 to 11, further comprising: receiving third perception information from a base station serving the at least one UE.

Clause 13. The method of clause 12, wherein the first perception-assistance information is further determined based on the third perception information.

Clause 14. The method of any of clauses 12 to 13, further comprising: transmitting second perception-assistance information to the base station, the second perception-assistance information determined based at least in part on the first perception information, the third perception information, or both.

Clause 15. The method of any of clauses 9 to 14, wherein: the first perception information is received from the UE via Long-Term Evolution (LTE) positioning protocol (LPP) signaling, and the first perception-assistance information is transmitted to the UE via LPP signaling.

Clause 16. The method of any of clauses 1 to 15, wherein the first perception information comprises: motion sensor information of the at least one UE, radar-based sensing information of the at least one UE, lidar-based sensing information of the at least one UE, beamforming information of the at least one UE, an orientation of the at least one UE, a periodicity of movement of the at least one UE, or any combination thereof.

Clause 17. The method of any of clauses 1 to 16, wherein the first perception-assistance information comprises: a change in a serving beam used for communication between the at least one UE and a base station, a change in a modulation and coding scheme (MCS) used for communication between the at least one UE and the base station, a reduced number of reference signals to be used for communication between the at least one UE and the base station, a reduced search space for an adaptive beam weight calculation used for communication between the at least one UE and the base station, or any combination thereof.

Clause 18. The method of any of clauses 1 to 17, wherein the at least one UE comprises: an extended reality device, a virtual reality device, an augmented reality device, a gaming device, an Internet of Things (IOT) device, or a vehicle.

Clause 19. A method of wireless communication performed by a user equipment (UE), comprising: transmitting first perception information to a perception-assistance node in communication with a base station serving the UE; and receiving first perception-assistance information from the perception-assistance node, the first perception-assistance information determined based at least in part on the first perception information.

Clause 20. The method of clause 19, further comprising: transmitting second perception information to a location server.

Clause 21. The method of clause 20, further comprising: receiving second perception-assistance information from the location server.

Clause 22. The method of clause 21, wherein: the second perception information is transmitted to the location server via Long-Term Evolution (LTE) positioning protocol (LPP) signaling, and the second perception-assistance information is received from the location server via LPP signaling.

Clause 23. The method of any of clauses 19 to 22, wherein the first perception information comprises: motion sensor information of the UE, radar-based sensing information of the UE, lidar-based sensing information of the UE, beamforming information of the UE, an orientation of the UE, a periodicity of movement of the UE, or any combination thereof.

Clause 24. The method of any of clauses 19 to 23, wherein the first perception-assistance information comprises: a change in a serving beam used for communication between the UE and the base station, a change in a modulation and coding scheme (MCS) used for communication between the UE and the base station, a reduced number of reference signals to be used for communication between the UE and the base station, a reduced search space for an adaptive beam weight calculation used for communication between the UE and the base station, or any combination thereof.

Clause 25. The method of any of clauses 19 to 24, wherein the perception-assistance node: is physically separate from the base station, or a logical entity within the base station.

Clause 26. The method of any of clauses 19 to 25, wherein the UE comprises: an extended reality device, a virtual reality device, an augmented reality device, a gaming device, an Internet of Things (IOT) device, or a vehicle.

Clause 27. The method of any of clauses 19 to 26, wherein the first perception information is transmitted to the perception-assistance node via: radio resource control (RRC) signaling, medium access control control elements (MAC-CEs) signaling, or uplink control information (UCI).

Clause 28. The method of any of clauses 19 to 27, wherein the first perception-assistance information is received from the perception-assistance node via: radio resource control (RRC) signaling, medium access control control elements (MAC-CEs) signaling, or downlink control information (DCI).

Clause 29. A network node, comprising: a memory; at least one transceiver; and at least one processor communicatively coupled to the memory and the at least one transceiver, the at least one processor configured to: receive, via the at least one transceiver, first perception information from at least one user equipment (UE); and transmit, via the at least one transceiver, first perception-assistance information to the at least one UE, the first perception-assistance information determined based at least in part on the first perception information.

Clause 30. The network node of clause 29, wherein the network node is a perception-assistance node.

Clause 31. The network node of clause 30, wherein the perception-assistance node: is physically separate from a base station, or a logical entity within a base station.

Clause 32. The network node of any of clauses 30 to 31, wherein the at least one processor is further configured to: receive, via the at least one transceiver, second perception information from a base station serving the at least one UE.

Clause 33. The network node of clause 32, wherein the first perception-assistance information is further determined based on the second perception information.

Clause 34. The network node of any of clauses 32 to 33, wherein the at least one processor is further configured to: transmit, via the at least one transceiver, second perception-assistance information to the base station, the second perception-assistance information determined based at least in part on the first perception information, the second perception information, or both.

Clause 35. The network node of any of clauses 30 to 34, wherein the first perception information is received from the at least one UE via: radio resource control (RRC) signaling, medium access control control elements (MAC-CEs) signaling, or uplink control information (UCI).

Clause 36. The network node of any of clauses 30 to 35, wherein the first perception-assistance information is transmitted to the at least one UE via: radio resource control (RRC) signaling, medium access control control elements (MAC-CEs) signaling, or downlink control information (DCI).

Clause 37. The network node of any of clauses 29 to 36, wherein the network node is a location server.

Clause 38. The network node of clause 37, wherein the at least one processor is further configured to: receive, via the at least one transceiver, second perception information from a perception-assistance node in communication with the at least one UE and a base station serving the at least one UE.

Clause 39. The network node of clause 38, wherein the first perception-assistance information is further determined based on the second perception information.

Clause 40. The network node of any of clauses 37 to 39, wherein the at least one processor is further configured to: receive, via the at least one transceiver, third perception information from a base station serving the at least one UE.

Clause 41. The network node of clause 40, wherein the first perception-assistance information is further determined based on the third perception information.

Clause 42. The network node of any of clauses 40 to 41, wherein the at least one processor is further configured to: transmit, via the at least one transceiver, second perception-assistance information to the base station, the second perception-assistance information determined based at least in part on the first perception information, the third perception information, or both.

Clause 43. The network node of any of clauses 37 to 42, wherein: the first perception information is received from the UE via Long-Term Evolution (LTE) positioning protocol (LPP) signaling, and the first perception-assistance information is transmitted to the UE via LPP signaling.

Clause 44. The network node of any of clauses 29 to 43, wherein the first perception information comprises: motion sensor information of the at least one UE, radar-based sensing information of the at least one UE, lidar-based sensing information of the at least one UE, beamforming information of the at least one UE, an orientation of the at least one UE, a periodicity of movement of the at least one UE, or any combination thereof.

Clause 45. The network node of any of clauses 29 to 44, wherein the first perception-assistance information comprises: a change in a serving beam used for communication between the at least one UE and a base station, a change in a modulation and coding scheme (MCS) used for communication between the at least one UE and the base station, a reduced number of reference signals to be used for communication between the at least one UE and the base station, a reduced search space for an adaptive beam weight calculation used for communication between the at least one UE and the base station, or any combination thereof.

Clause 46. The network node of any of clauses 29 to 45, wherein the at least one UE comprises: an extended reality device, a virtual reality device, an augmented reality device, a gaming device, an Internet of Things (IOT) device, or a vehicle.

Clause 47. A user equipment (UE), comprising: a memory; at least one transceiver; and at least one processor communicatively coupled to the memory and the at least one transceiver, the at least one processor configured to: transmit, via the at least one transceiver, first perception information to a perception-assistance node in communication with a base station serving the UE; and receive, via the at least one transceiver, first perception-assistance information from the perception-assistance node, the first perception-assistance information determined based at least in part on the first perception information.

Clause 48. The UE of clause 47, wherein the at least one processor is further configured to: transmit, via the at least one transceiver, second perception information to a location server.

Clause 49. The UE of clause 48, wherein the at least one processor is further configured to: receive, via the at least one transceiver, second perception-assistance information from the location server.

Clause 50. The UE of clause 49, wherein: the second perception information is transmitted to the location server via Long-Term Evolution (LTE) positioning protocol (LPP) signaling, and the second perception-assistance information is received from the location server via LPP signaling.

Clause 51. The UE of any of clauses 47 to 50, wherein the first perception information comprises: motion sensor information of the UE, radar-based sensing information of the UE, lidar-based sensing information of the UE, beamforming information of the UE, an orientation of the UE, a periodicity of movement of the UE, or any combination thereof.

Clause 52. The UE of any of clauses 47 to 51, wherein the first perception-assistance information comprises: a change in a serving beam used for communication between the UE and the base station, a change in a modulation and coding scheme (MCS) used for communication between the UE and the base station, a reduced number of reference signals to be used for communication between the UE and the base station, a reduced search space for an adaptive beam weight calculation used for communication between the UE and the base station, or any combination thereof.

Clause 53. The UE of any of clauses 47 to 52, wherein the perception-assistance node: is physically separate from the base station, or a logical entity within the base station.

Clause 54. The UE of any of clauses 47 to 53, wherein the UE comprises: an extended reality device, a virtual reality device, an augmented reality device, a gaming device, an Internet of Things (IOT) device, or a vehicle.

Clause 55. The UE of any of clauses 47 to 54, wherein the first perception information is transmitted to the perception-assistance node via: radio resource control (RRC) signaling, medium access control control elements (MAC-CEs) signaling, or uplink control information (UCI).

Clause 56. The UE of any of clauses 47 to 55, wherein the first perception-assistance information is received from the perception-assistance node via: radio resource control (RRC) signaling, medium access control control elements (MAC-CEs) signaling, or downlink control information (DCI).

Clause 57. A network node, comprising: means for receiving first perception information from at least one user equipment (UE); and means for transmitting first perception-assistance information to the at least one UE, the first perception-assistance information determined based at least in part on the first perception information.

Clause 58. The network node of clause 57, wherein the network node is a perception-assistance node.

Clause 59. The network node of clause 58, wherein the perception-assistance node: is physically separate from a base station, or a logical entity within a base station.

Clause 60. The network node of any of clauses 58 to 59, further comprising: means for receiving second perception information from a base station serving the at least one UE.

Clause 61. The network node of clause 60, wherein the first perception-assistance information is further determined based on the second perception information.

Clause 62. The network node of any of clauses 60 to 61, further comprising: means for transmitting second perception-assistance information to the base station, the second perception-assistance information determined based at least in part on the first perception information, the second perception information, or both.

Clause 63. The network node of any of clauses 58 to 62, wherein the first perception information is received from the at least one UE via: radio resource control (RRC) signaling, medium access control control elements (MAC-CEs) signaling, or uplink control information (UCI).

Clause 64. The network node of any of clauses 58 to 63, wherein the first perception-assistance information is transmitted to the at least one UE via: radio resource control (RRC) signaling, medium access control control elements (MAC-CEs) signaling, or downlink control information (DCI).

Clause 65. The network node of any of clauses 57 to 64, wherein the network node is a location server.

Clause 66. The network node of clause 65, further comprising: means for receiving second perception information from a perception-assistance node in communication with the at least one UE and a base station serving the at least one UE.

Clause 67. The network node of clause 66, wherein the first perception-assistance information is further determined based on the second perception information.

Clause 68. The network node of any of clauses 65 to 67, further comprising: means for receiving third perception information from a base station serving the at least one UE.

Clause 69. The network node of clause 68, wherein the first perception-assistance information is further determined based on the third perception information.

Clause 70. The network node of any of clauses 68 to 69, further comprising: means for transmitting second perception-assistance information to the base station, the second perception-assistance information determined based at least in part on the first perception information, the third perception information, or both.

Clause 71. The network node of any of clauses 65 to 70, wherein: the first perception information is received from the UE via Long-Term Evolution (LTE) positioning protocol (LPP) signaling, and the first perception-assistance information is transmitted to the UE via LPP signaling.

Clause 72. The network node of any of clauses 57 to 71, wherein the first perception information comprises:

motion sensor information of the at least one UE, radar-based sensing information of the at least one UE, lidar-based sensing information of the at least one UE, beamforming information of the at least one UE, an orientation of the at least one UE, a periodicity of movement of the at least one UE, or any combination thereof.

Clause 73. The network node of any of clauses 57 to 72, wherein the first perception-assistance information comprises: a change in a serving beam used for communication between the at least one UE and a base station, a change in a modulation and coding scheme (MCS) used for communication between the at least one UE and the base station, a reduced number of reference signals to be used for communication between the at least one UE and the base station, a reduced search space for an adaptive beam weight calculation used for communication between the at least one UE and the base station, or any combination thereof.

Clause 74. The network node of any of clauses 57 to 73, wherein the at least one UE comprises: an extended reality device, a virtual reality device, an augmented reality device, a gaming device, an Internet of Things (IOT) device, or a vehicle.

Clause 75. A user equipment (UE), comprising: means for transmitting first perception information to a perception-assistance node in communication with a base station serving the UE; and means for receiving first perception-assistance information from the perception-assistance node, the first perception-assistance information determined based at least in part on the first perception information.

Clause 76. The UE of clause 75, further comprising: means for transmitting second perception information to a location server.

Clause 77. The UE of clause 76, further comprising: means for receiving second perception-assistance information from the location server.

Clause 78. The UE of clause 77, wherein: the second perception information is transmitted to the location server via Long-Term Evolution (LTE) positioning protocol (LPP) signaling, and the second perception-assistance information is received from the location server via LPP signaling.

Clause 79. The UE of any of clauses 75 to 78, wherein the first perception information comprises: motion sensor information of the UE, radar-based sensing information of the UE, lidar-based sensing information of the UE, beamforming information of the UE, an orientation of the UE, a periodicity of movement of the UE, or any combination thereof.

Clause 80. The UE of any of clauses 75 to 79, wherein the first perception-assistance information comprises: a change in a serving beam used for communication between the UE and the base station, a change in a modulation and coding scheme (MCS) used for communication between the UE and the base station, a reduced number of reference signals to be used for communication between the UE and the base station, a reduced search space for an adaptive beam weight calculation used for communication between the UE and the base station, or any combination thereof.

Clause 81. The UE of any of clauses 75 to 80, wherein the perception-assistance node: is physically separate from the base station, or a logical entity within the base station.

Clause 82. The UE of any of clauses 75 to 81, wherein the UE comprises: an extended reality device, a virtual reality device, an augmented reality device, a gaming device, an Internet of Things (IOT) device, or a vehicle.

Clause 83. The UE of any of clauses 75 to 82, wherein the first perception information is transmitted to the perception-assistance node via: radio resource control (RRC) signaling, medium access control control elements (MAC-CEs) signaling, or uplink control information (UCI).

Clause 84. The UE of any of clauses 75 to 83, wherein the first perception-assistance information is received from the perception-assistance node via: radio resource control (RRC) signaling, medium access control control elements (MAC-CEs) signaling, or downlink control information (DCI).

Clause 85. A non-transitory computer-readable medium storing computer-executable instructions that, when executed by a network node, cause the network node to: receive first perception information from at least one user equipment (UE); and transmit first perception-assistance information to the at least one UE, the first perception-assistance information determined based at least in part on the first perception information.

Clause 86. The non-transitory computer-readable medium of clause 85, wherein the network node is a perception-assistance node.

Clause 87. The non-transitory computer-readable medium of clause 86, wherein the perception-assistance node: is physically separate from a base station, or a logical entity within a base station.

Clause 88. The non-transitory computer-readable medium of any of clauses 86 to 87, further comprising computer-executable instructions that, when executed by the network node, cause the network node to: receive second perception information from a base station serving the at least one UE.

Clause 89. The non-transitory computer-readable medium of clause 88, wherein the first perception-assistance information is further determined based on the second perception information.

Clause 90. The non-transitory computer-readable medium of any of clauses 88 to 89, further comprising computer-executable instructions that, when executed by the network node, cause the network node to: transmit second perception-assistance information to the base station, the second perception-assistance information determined based at least in part on the first perception information, the second perception information, or both.

Clause 91. The non-transitory computer-readable medium of any of clauses 86 to 90, wherein the first perception information is received from the at least one UE via: radio resource control (RRC) signaling, medium access control control elements (MAC-CEs) signaling, or uplink control information (UCI).

Clause 92. The non-transitory computer-readable medium of any of clauses 86 to 91, wherein the first perception-assistance information is transmitted to the at least one UE via: radio resource control (RRC) signaling, medium access control control elements (MAC-CEs) signaling, or downlink control information (DCI).

Clause 93. The non-transitory computer-readable medium of any of clauses 85 to 92, wherein the network node is a location server.

Clause 94. The non-transitory computer-readable medium of clause 93, further comprising computer-executable instructions that, when executed by the network node, cause the network node to: receive second perception information from a perception-assistance node in communication with the at least one UE and a base station serving the at least one UE.

Clause 95. The non-transitory computer-readable medium of clause 94, wherein the first perception-assistance information is further determined based on the second perception information.

Clause 96. The non-transitory computer-readable medium of any of clauses 93 to 95, further comprising computer-executable instructions that, when executed by the network node, cause the network node to: receive third perception information from a base station serving the at least one UE.

Clause 97. The non-transitory computer-readable medium of clause 96, wherein the first perception-assistance information is further determined based on the third perception information.

Clause 98. The non-transitory computer-readable medium of any of clauses 96 to 97, further comprising computer-executable instructions that, when executed by the network node, cause the network node to: transmit second perception-assistance information to the base station, the second perception-assistance information determined based at least in part on the first perception information, the third perception information, or both.

Clause 99. The non-transitory computer-readable medium of any of clauses 93 to 98, wherein: the first perception information is received from the UE via Long-Term Evolution (LTE) positioning protocol (LPP) signaling, and the first perception-assistance information is transmitted to the UE via LPP signaling.

Clause 100. The non-transitory computer-readable medium of any of clauses 85 to 99, wherein the first perception information comprises: motion sensor information of the at least one UE, radar-based sensing information of the at least one UE, lidar-based sensing information of the at least one UE, beamforming information of the at least one UE, an orientation of the at least one UE, a periodicity of movement of the at least one UE, or any combination thereof.

Clause 101. The non-transitory computer-readable medium of any of clauses 85 to 100, wherein the first perception-assistance information comprises: a change in a serving beam used for communication between the at least one UE and a base station, a change in a modulation and coding scheme (MCS) used for communication between the at least one UE and the base station, a reduced number of reference signals to be used for communication between the at least one UE and the base station, a reduced search space for an adaptive beam weight calculation used for communication between the at least one UE and the base station, or any combination thereof.

Clause 102. The non-transitory computer-readable medium of any of clauses 85 to 101, wherein the at least one UE comprises: an extended reality device, a virtual reality device, an augmented reality device, a gaming device, an Internet of Things (IOT) device, or a vehicle.

Clause 103. A non-transitory computer-readable medium storing computer-executable instructions that, when executed by a user equipment (UE), cause the UE to: transmit first perception information to a perception-assistance node in communication with a base station serving the UE; and receive first perception-assistance information from the perception-assistance node, the first perception-assistance information determined based at least in part on the first perception information.

Clause 104. The non-transitory computer-readable medium of clause 103, further comprising computer-executable instructions that, when executed by the UE, cause the UE to: transmit second perception information to a location server.

Clause 105. The non-transitory computer-readable medium of clause 104, further comprising computer-executable instructions that, when executed by the UE, cause the UE to: receive second perception-assistance information from the location server.

Clause 106. The non-transitory computer-readable medium of clause 105, wherein: the second perception information is transmitted to the location server via Long-Term Evolution (LTE) positioning protocol (LPP) signaling, and the second perception-assistance information is received from the location server via LPP signaling.

Clause 107. The non-transitory computer-readable medium of any of clauses 103 to 106, wherein the first perception information comprises: motion sensor information of the UE, radar-based sensing information of the UE, lidar-based sensing information of the UE, beamforming information of the UE, an orientation of the UE, a periodicity of movement of the UE, or any combination thereof.

Clause 108. The non-transitory computer-readable medium of any of clauses 103 to 107, wherein the first perception-assistance information comprises: a change in a serving beam used for communication between the UE and the base station, a change in a modulation and coding scheme (MCS) used for communication between the UE and the base station, a reduced number of reference signals to be used for communication between the UE and the base station, a reduced search space for an adaptive beam weight calculation used for communication between the UE and the base station, or any combination thereof.

Clause 109. The non-transitory computer-readable medium of any of clauses 103 to 108, wherein the perception-assistance node: is physically separate from the base station, or a logical entity within the base station.

Clause 110. The non-transitory computer-readable medium of any of clauses 103 to 109, wherein the UE comprises: an extended reality device, a virtual reality device, an augmented reality device, a gaming device, an Internet of Things (IOT) device, or a vehicle.

Clause 111. The non-transitory computer-readable medium of any of clauses 103 to 110, wherein the first perception information is transmitted to the perception-assistance node via: radio resource control (RRC) signaling, medium access control control elements (MAC-CEs) signaling, or uplink control information (UCI).

Clause 112. The non-transitory computer-readable medium of any of clauses 103 to 111, wherein the first perception-assistance information is received from the perception-assistance node via: radio resource control (RRC) signaling, medium access control control elements (MAC-CEs) signaling, or downlink control information (DCI).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a network node, comprising:

receiving first perception information from at least one user equipment (UE); and transmitting first perception-assistance information to the at least one UE, the first perception-assistance information determined based at least in part on the first perception information, wherein the first perception-assistance information comprises:

a change in a serving beam used for communication between the at least one UE and a base station, a change in a modulation and coding scheme (MCS) used for communication between the at least one UE and the base station, a reduced number of reference signals to be used for communication between the at least one UE and the base station, a reduced search space for an adaptive beam weight calculation used for communication between the at least one UE and the base station, or any combination thereof.

2. The method of claim 1, wherein the network node is a perception-assistance node.

3. The method of claim 2, wherein the perception-assistance node:

is physically separate from a base station, or a logical entity within a base station.

4. The method of claim 2, further comprising:

receiving second perception information from a base station serving the at least one UE.

5. The method of claim 4, wherein the first perception-assistance information is further determined based on the second perception information.

6. The method of claim 4, further comprising:

transmitting second perception-assistance information to the base station, the second perception-assistance information determined based at least in part on the first perception information, the second perception information, or both.

7. The method of claim 2, wherein the first perception information is received from the at least one UE via:

radio resource control (RRC) signaling, medium access control control elements (MAC-CEs) signaling, or uplink control information (UCI).

8. The method of claim 2, wherein the first perception-assistance information is transmitted to the at least one UE via:

radio resource control (RRC) signaling, medium access control control elements (MAC-CEs) signaling, or downlink control information (DCI).

9. The method of claim 1, wherein the network node is a location server.

10. The method of claim 9, further comprising:

receiving second perception information from a perception-assistance node in communication with the at least one UE and a base station serving the at least one UE.

11. The method of claim 10, wherein the first perception-assistance information is further determined based on the second perception information.

12. The method of claim 9, further comprising:

receiving third perception information from a base station serving the at least one UE.

13. The method of claim 12, wherein the first perception-assistance information is further determined based on the third perception information.

14. The method of claim 12, further comprising:

transmitting second perception-assistance information to the base station, the second perception-assistance information determined based at least in part on the first perception information, the third perception information, or both.

15. The method of claim 9, wherein:

the first perception information is received from the UE via Long-Term Evolution (LTE) positioning protocol (LPP) signaling, and the first perception-assistance information is transmitted to the UE via LPP signaling.

16. The method of claim 1, wherein the first perception information comprises:

motion sensor information of the at least one UE, radar-based sensing information of the at least one UE, lidar-based sensing information of the at least one UE, beamforming information of the at least one UE, an orientation of the at least one UE, a periodicity of movement of the at least one UE, or any combination thereof.

17. The method of claim 1, wherein the at least one UE comprises:

an extended reality device, a virtual reality device, an augmented reality device, a gaming device, an Internet of Things (IoT) device, or a vehicle.

18. A method of wireless communication performed by a user equipment (UE), comprising:

transmitting first perception information to a perception-assistance node in communication with a base station serving the UE; and receiving first perception-assistance information from the perception-assistance node, the first perception-assistance information determined based at least in part on the first perception information, wherein the first perception-assistance information comprises:

a change in a serving beam used for communication between the UE and the base station, a change in a modulation and coding scheme (MCS) used for communication between the UE and the base station, a reduced number of reference signals to be used for communication between the UE and the base station, a reduced search space for an adaptive beam weight calculation used for communication between the UE and the base station, or any combination thereof.

19. The method of claim 18, further comprising:

transmitting second perception information to a location server.

20. The method of claim 19, further comprising:

receiving second perception-assistance information from the location server.

21. The method of claim 20, wherein:

the second perception information is transmitted to the location server via Long-Term Evolution (LTE) positioning protocol (LPP) signaling, and the second perception-assistance information is received from the location server via LPP signaling.

22. The method of claim 18, wherein the first perception information comprises:

motion sensor information of the UE, radar-based sensing information of the UE, lidar-based sensing information of the UE, beamforming information of the UE, an orientation of the UE, a periodicity of movement of the UE, or any combination thereof.

23. The method of claim 18, wherein the perception-assistance node:

is physically separate from the base station, or a logical entity within the base station.

24. The method of claim 18, wherein the UE comprises:

an extended reality device, a virtual reality device, an augmented reality device, a gaming device, an Internet of Things (IoT) device, or a vehicle.

25. The method of claim 18, wherein the first perception information is transmitted to the perception-assistance node via:

radio resource control (RRC) signaling, medium access control control elements (MAC-CEs) signaling, or uplink control information (UCI).

26. The method of claim 18, wherein the first perception-assistance information is received from the perception-assistance node via:

radio resource control (RRC) signaling, medium access control control elements (MAC-CEs) signaling, or downlink control information (DCI).

27. A network node, comprising:

one or more memories;

one or more transceivers; and one or more processors communicatively coupled to the one or more memories and the one or more transceivers, the one or more processors, either alone or in combination, configured to:

receive, via the one or more transceivers, first perception information from at least one user equipment (UE); and transmit, via the one or more transceivers, first perception-assistance information to the at least one UE, the first perception-assistance information determined based at least in part on the first perception information, wherein the first perception-assistance information comprises:

a change in a serving beam used for communication between the at least one UE and a base station, a change in a modulation and coding scheme (MCS) used for communication between the at least one UE and the base station, a reduced number of reference signals to be used for communication between the at least one UE and the base station, a reduced search space for an adaptive beam weight calculation used for communication between the at least one UE and the base station, or any combination thereof.

28. The network node of claim 27, wherein the network node is a perception-assistance node.

29. The network node of claim 28, wherein the one or more processors, either alone or in combination, are further configured to:

receive, via the one or more transceivers, second perception information from a base station serving the at least one UE.

30. The network node of claim 29, wherein the one or more processors, either alone or in combination, are further configured to:

transmit, via the one or more transceivers, second perception-assistance information to the base station, the second perception-assistance information determined based at least in part on the first perception information, the second perception information, or both.

31. The network node of claim 27, wherein the network node is a location server.

32. The network node of claim 31, wherein the one or more processors, either alone or in combination, are further configured to:

receive, via the one or more transceivers, second perception information from a perception-assistance node in communication with the at least one UE and a base station serving the at least one UE.

33. The network node of claim 31, wherein the one or more processors, either alone or in combination, are further configured to:

receive, via the one or more transceivers, third perception information from a base station serving the at least one UE.

34. The network node of claim 27, wherein the first perception information comprises:

motion sensor information of the at least one UE, radar-based sensing information of the at least one UE, lidar-based sensing information of the at least one UE, beamforming information of the at least one UE, an orientation of the at least one UE, a periodicity of movement of the at least one UE, or any combination thereof.

35. A user equipment (UE), comprising:

one or more memories;

one or more transceivers; and one or more processors communicatively coupled to the one or more memories and the one or more transceivers, the one or more processors, either alone or in combination, configured to:

transmit, via the one or more transceivers, first perception information to a perception-assistance node in communication with a base station serving the UE; and receive, via the one or more transceivers, first perception-assistance information from the perception-assistance node, the first perception-assistance information determined based at least in part on the first perception information, wherein the first perception-assistance information comprises:

a change in a serving beam used for communication between the UE and the base station, a change in a modulation and coding scheme (MCS) used for communication between the UE and the base station, a reduced number of reference signals to be used for communication between the UE and the base station, a reduced search space for an adaptive beam weight calculation used for communication between the UE and the base station, or any combination thereof.

36. The UE of claim 35, wherein the one or more processors, either alone or in combination, are further configured to:

transmit, via the one or more transceivers, second perception information to a location server.

37. The UE of claim 36, wherein the one or more processors, either alone or in combination, are further configured to:

receive, via the one or more transceivers, second perception-assistance information from the location server.

* * * * *